United States Patent [19]
Harada et al.

[11] Patent Number: 5,956,339
[45] Date of Patent: Sep. 21, 1999

[54] APPARATUS FOR SELECTING A ROUTE IN A PACKET-SWITCHED COMMUNICATIONS NETWORK

[75] Inventors: Takayuki Harada; Shinichi Araya, both of Yokohama, Japan

[73] Assignee: Fujitsu Limited, Kanagawa, Japan

[21] Appl. No.: 08/837,235

[22] Filed: Apr. 10, 1997

[30] Foreign Application Priority Data

Oct. 17, 1996 [JP] Japan .................................... 8-274673

[51] Int. Cl.⁶ .................................................. H04L 12/28
[52] U.S. Cl. ........................... 370/400; 370/396; 709/238
[58] Field of Search .................................... 370/351, 238, 370/400, 408, 409, 389, 396, 397; 395/200.68, 200.71

[56] References Cited

U.S. PATENT DOCUMENTS

| | | | |
|---|---|---|---|
| 5,600,638 | 2/1997 | Bertin et al. | 370/351 |
| 5,719,942 | 2/1998 | Aldred et al. | 380/49 |
| 5,831,982 | 11/1998 | Hummel | 370/396 |
| 5,835,710 | 11/1998 | Nagami et al. | 709/238 |

FOREIGN PATENT DOCUMENTS

| | | |
|---|---|---|
| 3-108923 | 5/1991 | Japan . |
| 6-343080 | 12/1994 | Japan . |

*Primary Examiner*—Hassan Kizou
*Assistant Examiner*—Clement Townsend
*Attorney, Agent, or Firm*—Helfgott & Karas, PC.

[57] ABSTRACT

An apparatus for selecting a route in a packet-switched network where a plurality of candidate routes are available between a sending node and a receiving node. Total capacity calculation unit disposed in the sending node calculates the total channel capacity of each candidate route by summing up channel capacities of the inter-node links between the sending node and the receiving node. First selection unit chooses the candidate route(s) that exhibit the largest value of the total channel capacity. Uniformity calculation unit is activated when the first selection unit selected a plurality of candidate routes. The uniformity calculation unit calculates uniformity of each candidate route by evaluating the channel capacities of the inter-node links. The second selection unit chooses one of the candidate routes based on the calculated uniformity. This route will be used in packet transmission from the sending node to the receiving node.

14 Claims, 29 Drawing Sheets

FIG. 4(A)

NODE NUMBER-LINK SET TABLE

| NODE NO. | LINK SET NO. |
|---|---|
| 919325 | 1 |
| 919326 | 2 |
| — | 3 |

FIG. 4(B)

LINK SET-PORT TABLE

| LINK SET NO. | PORT NO. |
|---|---|
| 1 | 1, 2, 3 |
| 2 | 4, 5, 6 |
| 3 | 7, 8 |

FIG. 4(C)

TERMINAL-SL TABLE

| TERMINAL NO. | SL NO. |
|---|---|
| 0001 | 9 |
| 0002 | 10 |
| 0003 | 11 |

| SENDING NODE | RECEIVING NODE | RELAYING NODE #1 | RELAYING NODE #2 | TOTAL CAPACITY |
|---|---|---|---|---|
| SS-1 | SS-2 | — | — | 50 |
|  | SS-3 | SS-2 | — | 60 |
|  | SS-4 | SS-5 | — | 80 |
|  | SS-5 | — | — | 30 |
|  | SS-6 | SS-2 | SS-3 | 70 |

· · ·

| SENDING NODE | RECEIVING NODE | RELAYING NODE #1 | RELAYING NODE #2 | TOTAL CAPACITY |
|---|---|---|---|---|
| SS-6 | SS-1 | SS-3 | SS-2 | 70 |
|  | SS-2 | SS-3 | — | 20 |
|  | SS-3 | — | — | 10 |
|  | SS-4 | SS-3 | SS-5 | 90 |
|  | SS-5 | SS-3 | — | 40 |

PRIOR ART
FIG. 25

APPARATUS FOR SELECTING A ROUTE IN A PACKET-SWITCHED COMMUNICATIONS NETWORK

BACKGROUND OF THE INVENTION

1. Field of the Invention

The present invention relates to an apparatus for selecting a route for delivering packets in a packet-switched communications network, and more particularly, to an apparatus for selecting a route in a packet-switched communications network where a plurality of candidate routes are available between a sending node and a receiving node.

2. Description of the Related Art

In recent years, a packet-switched high-speed data communication service called "Switched Multi-megabit Data Service (SMDS)" has been developed for use in broadband networks. This connectionless data service delivers a packet to its destination according to address information written in its header field, without establishing a network connection in advance. When a plurality of intermediate routes exist between a sending node and a receiving node in such a fast packet-switched network, the system must select one of the routes which is considered to be the most suitable.

To make such a selection, conventional connectionless fast packet-switched networks execute a route selection process by using three methods #1 to #3 based on different criteria as detailed below. These three methods are prioritized and used in combination of two or more until a single best solution is reached. [METHOD #1] For each candidate route that connects the sending node to the receiving node, the selection process counts the number of intermediate nodes (or relaying nodes) on the route, and chooses the best route(s) that exhibit the smallest number of relaying nodes.

[METHOD #2] For each candidate route, the selection process accumulates the channel capacity of every intermediate channel (or inter-node link) running between two adjacent nodes on the route, and then chooses the route(s) that exhibit the largest total channel capacity.

[METHOD #3] For identification purposes, serial node numbers are assigned beforehand to all the relaying nodes. From among the candidate routes remaining unsolved, the route selection process chooses one route that involves a relaying node with the smallest identification number.

The route selection process tries to choose a route by using the above method #1. If this attempt results in two or more candidate routes meeting the first criterion, then the selection process tries it again with the method #2. The selection process will further apply the method #3 if the method #2 failed to narrow down the candidates to one.

Take a fast packet-switched network of FIG. 24, for example. Being applied to this network, the above-described conventional selection process will yield a routing data table as shown in FIG. 25, in which all possible sender-receiver pairs and their respective best routes are summarized, together with the total channel capacity evaluated.

More specifically, the fast packet-switched network of FIG. 24 consists of six nodes named "SS-1" to "SS-6", where "SS" implies switching systems. These nodes SS-1 to SS-6 are interconnected by a plurality of internode links each having predetermined channel capacity of, say 50, 10, or 30. Think of a packet that is sent from the node SS-1 (sending node) to the node SS-3 (receiving node), for example. Apparently, there are two potential routes: one involving the node SS-2 as a relaying node and the other involving the node SS-5 as a relaying node. In this case, however, the first two selection methods #1 and #2 are unable to determine which route will provide better performance in the packet transmission. Thus, the route selection process finally chooses the route via the node SS-2, according to the node number-based third selection method #3. The routing data table shown in FIG. 25 is a summary of such a route selection process for all possible sender-receiver pairs.

The above-described conventional route selection method, however, has the following four problems:

[PROBLEM #1] Assume that a fast packet-switched network shown in FIG. 26 is given, and there are two possible ways for a sending node SS-1 to reach a receiving node SS-4: a first route passing through a relaying node SS-2 and a second route passing through a relaying node SS-3. When the above-described route selection methods are applied to this case, the first route will finally be chosen, based on the identification number third selection method #3, because the selection methods #1 and #2 cannot differentiate between the two candidates.

However, the obtained route, which involves the relaying node SS-2, is not the best route at all. The reason is that this route includes a narrow channel [SS-2]–[SS-4] with capacity "10" which plays as a dominant factor to determine the overall performance of this route. That is, the packet transmission capability of this route is limited by the channel capacity "10".

As opposed to this, the other route which passes through the node SS-3 provides the minimum channel capacity of 30. That is, this second route has a greater packet transmission capability with the capacity of 30, and therefore, the route selection process should have chosen the second route to reduce the probability of traffic congestion and enable more stable packet transmission. Nevertheless, it chooses the first route without knowing the benefits of the other route.

[PROBLEM #2] Assume next that another fast packet-switched network shown in FIG. 27 is given, where two routes are available for a node SS-1 to reach another node SS-3: a first route passing through a relaying node SS-2 and a second route passing through a relaying node SS-4. According to the above-described algorithm, the route selection process will choose the second route, based on the selection method #2.

However, it should be noted that the relaying node SS-2 is connected not only to the nodes SS-1 and SS-4 but also to other neighboring nodes SS-5, SS-6, and SS-7, and therefore, packets may flow into the node SS-2 from those nodes. If this point is taken into consideration, the first route passing through the relaying node SS-4 will probably allow more stable packet transmission than the first route which uses the node SS-2 as the relaying node. Nevertheless, the conventional route selection process selects the second route without thinking of the above merit of the first route.

[PROBLEM #3] FIG. 28 shows still another example of a fast packet-switched network, where packets are sent from three nodes SS-5, SS-6, and SS-7 to a single node SS4 via a relaying node SS-1. There are two routes available for the relaying node SS-1 to reach the destination node SS-4: a first route passing through a relaying node SS-2 and a second route passing through a different relaying node SS-3. According to the above-described route selection algorithms, the selection methods #1 and #2 are unable to differentiate between those two candidate routes, and as a result of comparison of the node numbers, the first route will finally be chosen to provide data services for all the sending nodes SS-5, SS-6, and SS-7.

The second route will never be chosen, although it has the same channel capacity as that of the first route. This route selection will impose a greater load to the first route, while leaving the second route unused. As such, the conventional route selection algorithm has a problem in terms of effective use of routes available in the network.

[PROBLEM #4] In a fast packet-switched network shown in FIG. 29, a sending node SS-1 transmits a packet to a receiving node SS-6, where two possible routes exist: a first route involving a pair of relaying nodes SS-4 and SS-5, and a second route involving another pair of relaying nodes SS-2 and SS-3. According to the conventional route selection algorithm, the selection methods #1 and #2 cannot differentiate between the two candidates. As a result of comparison of the node numbers, the second route is finally chosen.

The non-selected first route, however, is backed up by a spare channel running in parallel with the first route for the purpose of fault tolerance. This first route will provide more reliable packet transmission services than the second route. Nevertheless, the conventional route selection algorithm chooses the second route without knowing such a benefit of the first route.

SUMMARY OF THE INVENTION

Taking the above into consideration, a first object of the present invention is to provide an apparatus for selecting a route in a packet-switched network, which allows stable packet transmission.

A second object of the present invention is to provide an apparatus for choosing a route in a packet-switched network, which makes effective use of a plurality of routes available in the network.

To accomplish the above objects, according to the present invention, there is provided an apparatus for selecting a route in a packet-switched network where a plurality of candidate routes are available between a sending node and a receiving node. Each candidate route is formed by a plurality of inter-node links that are joined together by relaying nodes, and each inter-node link has its predetermined channel capacity.

The apparatus comprises the following elements. Total capacity calculation means calculates total channel capacity of each candidate route by summing up the channel capacities of the inter-node links between the sending node and the receiving node. First selection means obtains at least one first-selected route by choosing at least one candidate route that exhibits the largest value of the total channel capacity calculated by the total capacity calculation means. Uniformity calculation means, activated when the first selection means selected a plurality of first-selected routes, calculates uniformity of each of the first-selected routes by evaluating the channel capacities of the inter-node links thereof. Second selection means, coupled to the uniformity calculation means, chooses one of the first-selected routes based on the uniformity calculated by the uniformity calculation means.

There is also provided another apparatus for selecting a route in a packet-switched communications network where a plurality of sending nodes are linked to a particular relaying node and a plurality of candidate routes are available between the particular relaying node and a receiving node.

The apparatus comprises the following elements. Total capacity calculation means calculates total channel capacity of each candidate route by summing up the channel capacities of the inter-node links between the sending node and the receiving node. Selection means chooses at least one candidate route that exhibits the largest value of the total channel capacity calculated by the total capacity calculation means. Signal assignment means is activated when the selection means chose a plurality of candidate routes. The signal assignment means assigns signals sent from the plurality of sending nodes equally to the plurality of candidate routes selected by the selection means.

To accomplish the above objects, according to the present invention, there is provided still another apparatus for selecting a route in a packet-switched communications network where a plurality of candidate routes are available between a sending node and a receiving node. Here, the sending node handles transmission signals sent to/from a plurality of user terminals.

The apparatus comprises the following elements. Total capacity calculation means calculates total channel capacity of each candidate route by summing up the channel capacities of the inter-node links between the sending node and the receiving node. Selection means chooses at least one candidate route that exhibits the largest value of the total channel capacity calculated by the total capacity calculation means. Signal assignment means, activated when the selection means chose a plurality of candidate routes, assigns signals sent from the plurality of user terminals equally to the plurality of candidate routes selected by the selection means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4(A) is a diagram showing a correspondence between node numbers and link set numbers;

FIG. 4(B) is a diagram showing a correspondence between link set numbers and port numbers;

FIG. 4(C) is a diagram showing a correspondence between terminal numbers of user terminals and signaling link numbers;

FIG. 25 is a diagram showing results of a route selection process performed by using conventional routing methods;

DESCRIPTION OF THE PREFERRED EMBODIMENTS

Several embodiments of the present invention will be described below with reference to the accompanying drawings.

Figure 1:
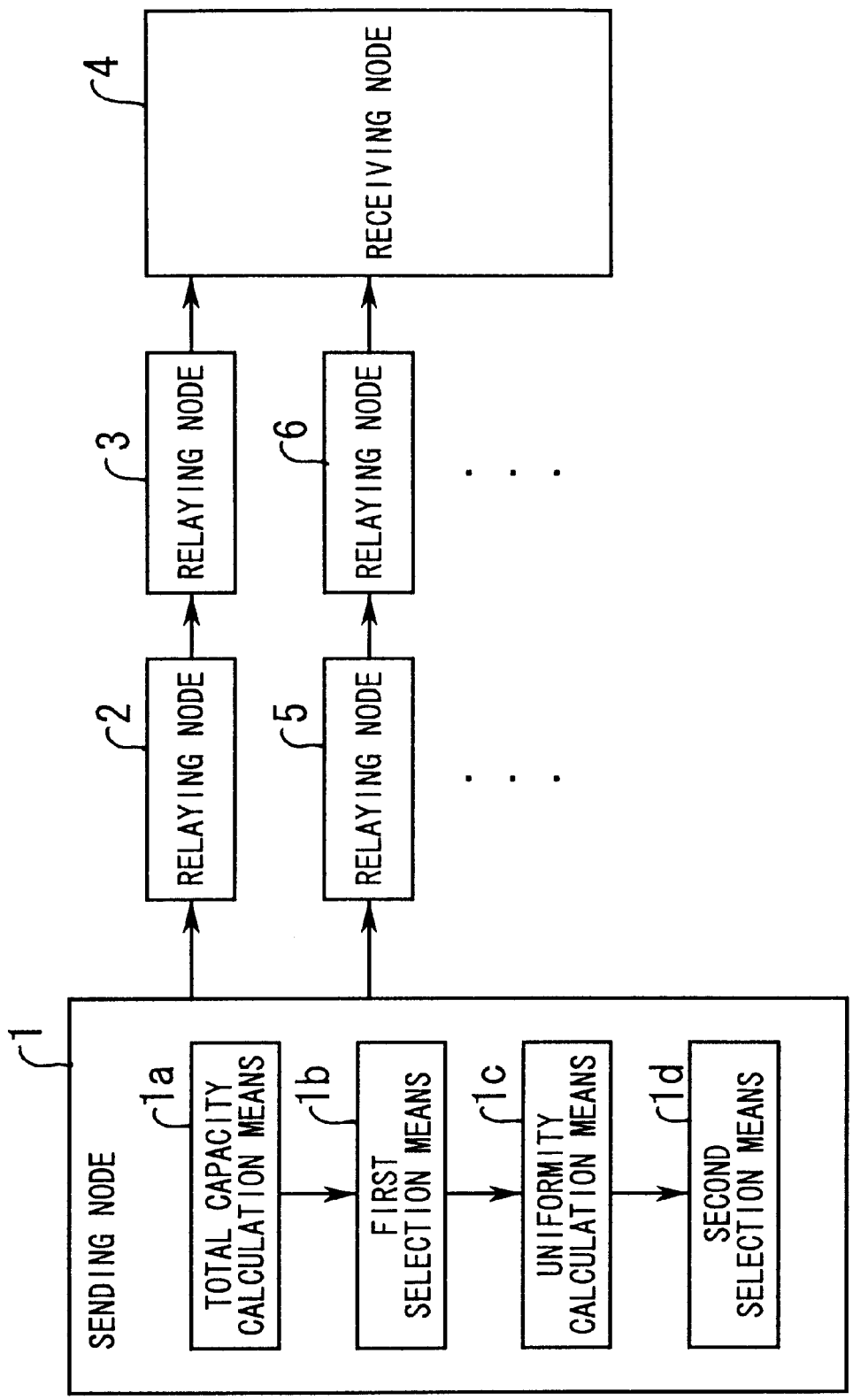
FIG. 1 is a conceptual view of the present invention.

Referring first to FIG. 1, the concept of a first embodiment of the present invention will be explained. FIG. 1 shows a packet-switched network where a sending node 1 and a receiving node 4 are linked by a plurality of relaying nodes 2, 3, 5, and 6. The nodes are interconnected with inter-node links having their respective channel capacities. In such a system environment, the first embodiment of the present invention comprises total capacity calculation means 1a, first selection means 1b, uniformity calculation means 1c, and second selection means 1d, whose functions are defined as follows.

The total capacity calculation means 1a calculates total channel capacity of each candidate route between the sending node 1 and the receiving node 4 by summing up the channel capacities of the inter-node links on the candidate route concerned. The first selection means 1b obtains at least one first-selected route by choosing at least one candidate route that exhibits the largest value of the total channel capacity calculated by the total capacity calculation means 1a. The uniformity calculation means 1c is activated when the first selection means 1b selected a plurality of first-selected routes. The uniformity calculation means 1c calculates uniformity of each of the first-selected routes by evaluating the channel capacities of the inter-node links thereof. The second selection means 1d chooses one of the first-selected routes based on the uniformity calculated by the uniformity calculation means 1c.

More specifically, there are two routes between the sending node 1 and receiving node 4; one includes relaying nodes 2 and 3, and the other includes relaying nodes 5 and 6. The total capacity calculation means 1a disposed in the sending node 1 calculates the total capacity of each route by accumulating the capacity of each inter-node link on the way from the sending node 1 to the receiving node 4. The first selection means 1b chooses the route(s) that exhibit the largest value of the total channel capacity. If this first step of route selection could narrow down the candidates to a single best route, this sole route will be used to transfer packets from the sending node 1 to the receiving node 4.

If the first selection means 1b has selected a plurality of candidate routes having the same total channel capacity, the uniformity calculation means 1c calculates uniformity of each candidate route by evaluating the channel capacity of inter-node links that constitute the candidate route under test. When a specific route is given, its uniformity is defined as a factor that indicates how the inter-node links as part of the route are equalized in terms of channel capacity. That is, a candidate route will have a higher uniformity when the inter-node links of that route exhibit less deviations from their average channel capacity.

The second selection means 1d tries to choose a route based on the uniformity values calculated for the candidate routes. More specifically, the second selection means 1d selects a route that exhibits the best uniformity value from among those calculated by the uniformity calculation means 1c, and uses this route to send packets from the sending node 1 to the receiving node 4.

In the way described above, the route selection apparatus of the first embodiment determines the best route out of a plurality of potential candidate routes, considering the uniformity of inter-node links of each route in terms of channel capacity. This channel uniformity-based algorithm works effectively even when the comparison of total channel capacities cannot limit the range of candidates enough to reach a unique solution. It reduces the probability of network traffic congestion and thus allows stable packet transmission.

Figure 2:
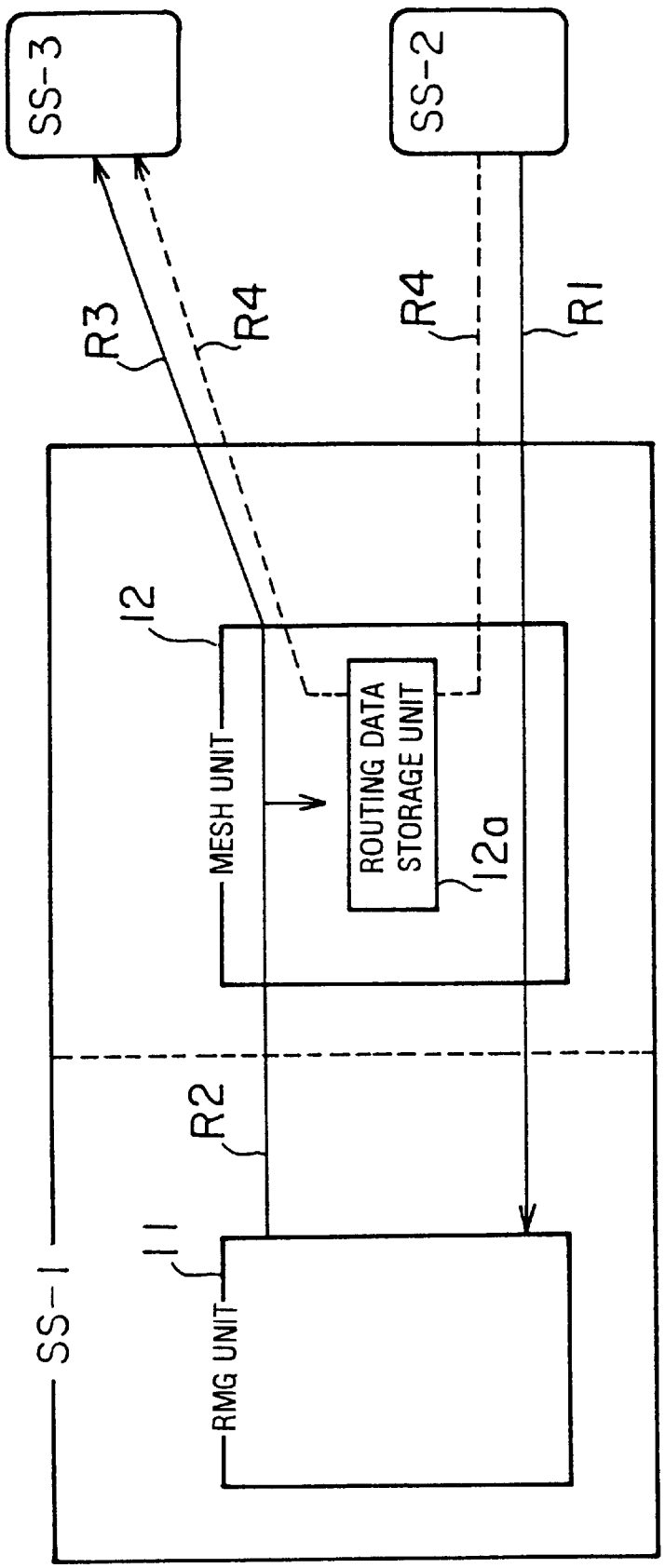
FIG. 2 is a diagram showing a part of a fast packet-switched network of a first embodiment of the present invention, as well as illustrating a simplified internal structure of a node as part of the fast packet-switched network.
Figure 3:
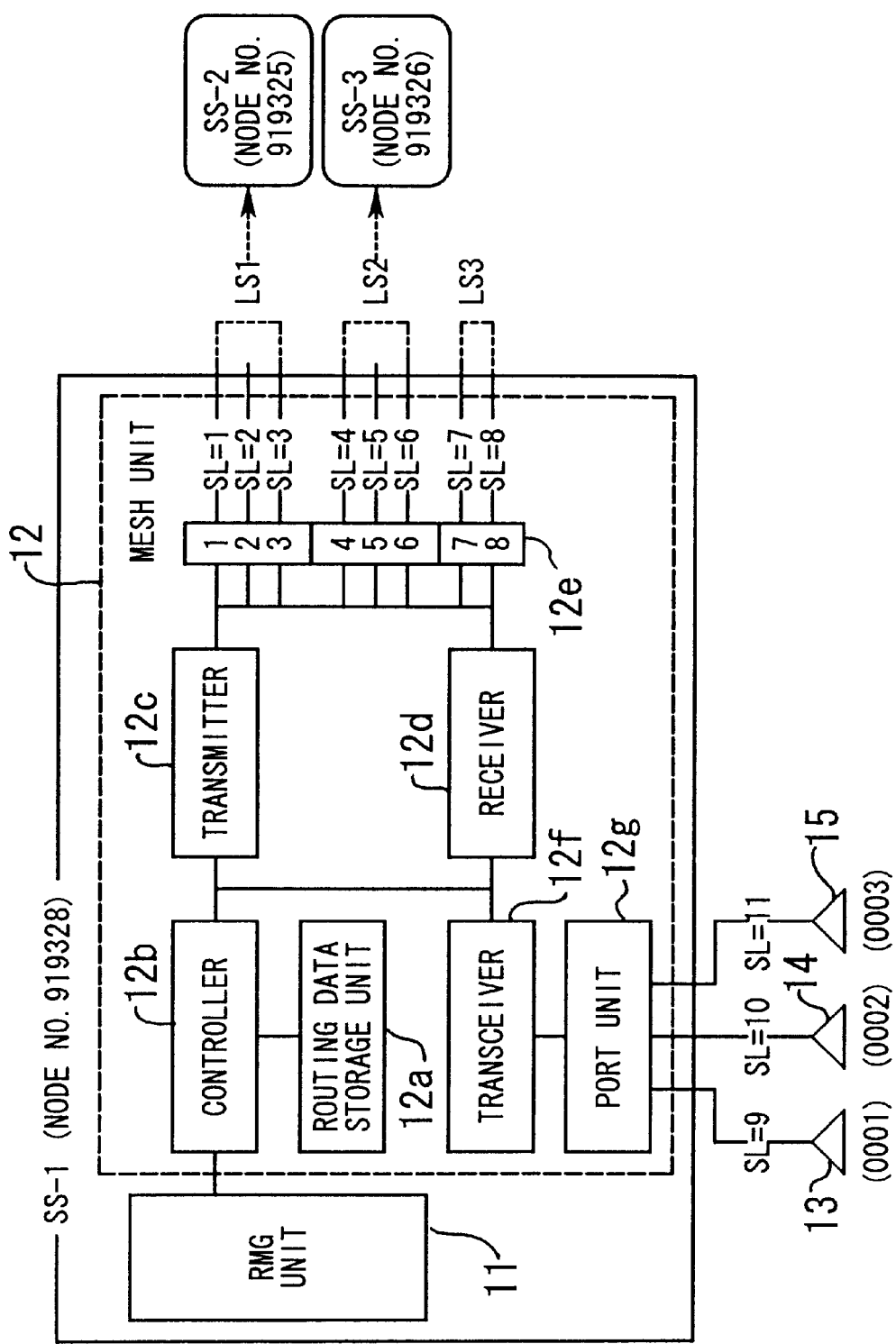
FIG. 3 is a block diagram showing the detailed structure of the node illustrated in FIG. 2.

Referring next to FIGS. 2 and 3, a more specific structure of the first embodiment will be explained. FIG. 2 shows a part of a fast packet-switched network and also depicts an internal arrangement of a network node in simplified form, while FIG. 3 is a block diagram showing the detailed structure of the node depicted in FIG. 2.

More specifically, FIG. 2 shows three nodes SS-1 to SS-3 serving as switching systems as part of the fast packet-switched network. While all the nodes have the same internal structure, FIG. 2 only depicts that of the node SS-1. The node SS-1 comprises a routing management (RMG) unit 11 and a message handler shelf (MESH) unit 12 including a routing data storage unit 12a. Based on the channel capacity and other information, the RMG unit 11 creates routing data which define a route for packet transmission from a sending node to a receiving node. The RMG unit 11 is an intelligent device including a processor, and all the structural elements 1a to 1d explained in FIG. 1 are implemented as firmware functions of the RMG unit 11.

Assume here that the node SS-2 sent a message to report that the channel capacity was changed at a certain part of the network. This message is delivered via a path R1 as indicated in FIG. 2 and finally reaches the RMG unit 11. The RMG unit 11 reads the message and reforms the routing data, as well as updating its own database storing channel capacity information. The reformed routing data is sent to the MESH unit 12 via a message path R2 to allow the contents of the routing data storage unit 12a to be updated.

The MESH unit 12 forwards the update information regarding the channel capacity to the node SS-3 via a message path R3. Such a process to update the channel capacity information will be also initiated when the system is set up.

Referring to the routing data stored in the routing data storage unit 12a, the MESH unit 12 controls the transmission of packets. Assume that the node SS-2, for example, has transmitted a packet addressed to the node SS-3 using the node SS-1 as a relaying node. Upon reception of this packet, the MESH unit 12 examines its destination address, looks in the routing data for best path, and forwards the packet to the node SS-3, thus allowing the packet to be delivered over the path R4.

FIG. 3 shows the inside structure of the MESH unit 12. In addition to the aforementioned routing data storage unit 12a, the MESH unit 12 comprises: a controller 12b, a transmitter 12c, a receiver 12d, a port unit 12e, a transceiver 12f, and a port unit 12g. The controller 12b controls packet transmission, referring to the routing data stored in the routing data storage unit 12a. Under the control of this controller 12b, the transmitter 12c receives signals from the transceiver 12f and receiver 12d and retransmits them to another node through a predetermined port as part of the port unit 12e. The receiver 12d receives packets from other nodes and delivers them to the transceiver 12f or transmitter 12c, under the control of the controller 12b. The transceiver 12f receives signals from user terminals (subscriber terminal) 13–15 connected to the node SS-1 via the port unit 12g and forwards signals from the receiver 12d to the user terminals 13–15.

The port unit 12e consists of eight ports numbered from #1 to #8, to which signaling links SL-1 to SL-8 are connected, respectively. The signaling links SL-1 to SL-3 are extended to the node SS-2, while being bundled into a first link set LS1. Other signaling links SL-4 to SL-6 are also bundled into a second link set LS2, which is connected to the node SS-3. The remaining signaling links SL-7 and SL-8 form a third link set SL3, but this link set is left unused.

The node SS-1 is assigned a node number "919328" for identification purposes, and similarly, the nodes SS-2 and SS-3 are numbered "919325" and "919326," respectively. The port unit 12g serves as an interface to the user terminal 13–15 through signaling links SL-9 to SL-11. The user terminals 13, 14, and 15 are also assigned their respective identification numbers, "0001," "0002," and "0003," respectively.

Based on the above structural arrangement of each node, the routing data is formulated and stored in the routing data storage unit 12a as shown in FIGS. 4(A)–4(C). More specifically, FIGS. 4(A) shows the correspondence between the node numbers and link set numbers, FIG. 4(B) shows the correspondence between the link set numbers and port numbers, and 4(C) shows the correspondence between the terminal numbers and signaling link numbers.

The following description will clarify how the nodes transfer a packet by using such routing data, assuming that the node SS-3 is attempting packet transmission to the node SS-2 via the node SS-1. When a packet is transmitted from the sending node SS-3, the receiver 12d in the relaying node receives the packet and supplies its header information to the controller 12b. The controller 12b extracts the node number "919325" from the header information and looks up the corresponding link set number in the first table as in FIG. 4(A), thereby obtaining the link set number LS1. The controller 12b issues a command to the transmitter 12c so that it will receive the packet from the receiver 12d and output the received packet according to the link set number LS1. Based on the given link set number LS1, the transmitter 12c consults the lookup table in FIG. 4(B), thereby obtaining the port numbers #1, #2, and #3. The transmitter 12c transmits the packet through the ports #1, #2, and #3. These ports are used to send a series of packets in ascending sequence of the port number at certain time intervals.

When a packet is sent from the node SS-3 to the user terminal 13 that belongs to the node SS-1, the receiver 12d receives the packet from the node SS-3 and sends its header information to the controller 12b. Extracting the node number of the receiving node and the terminal identification number out of the header information, the controller 12b recognizes the node number "919328" as its own and the terminal number "0001" as its local user's. The controller 12b then consults the table shown in FIG. 4(C) to obtain the signaling link number SL9 corresponding to the terminal number "0001." The controller 12b issues a command to the transceiver 12f to receive the packet from the receiver 12d and output the received packet using the signaling link SL-9.

Figure 5:
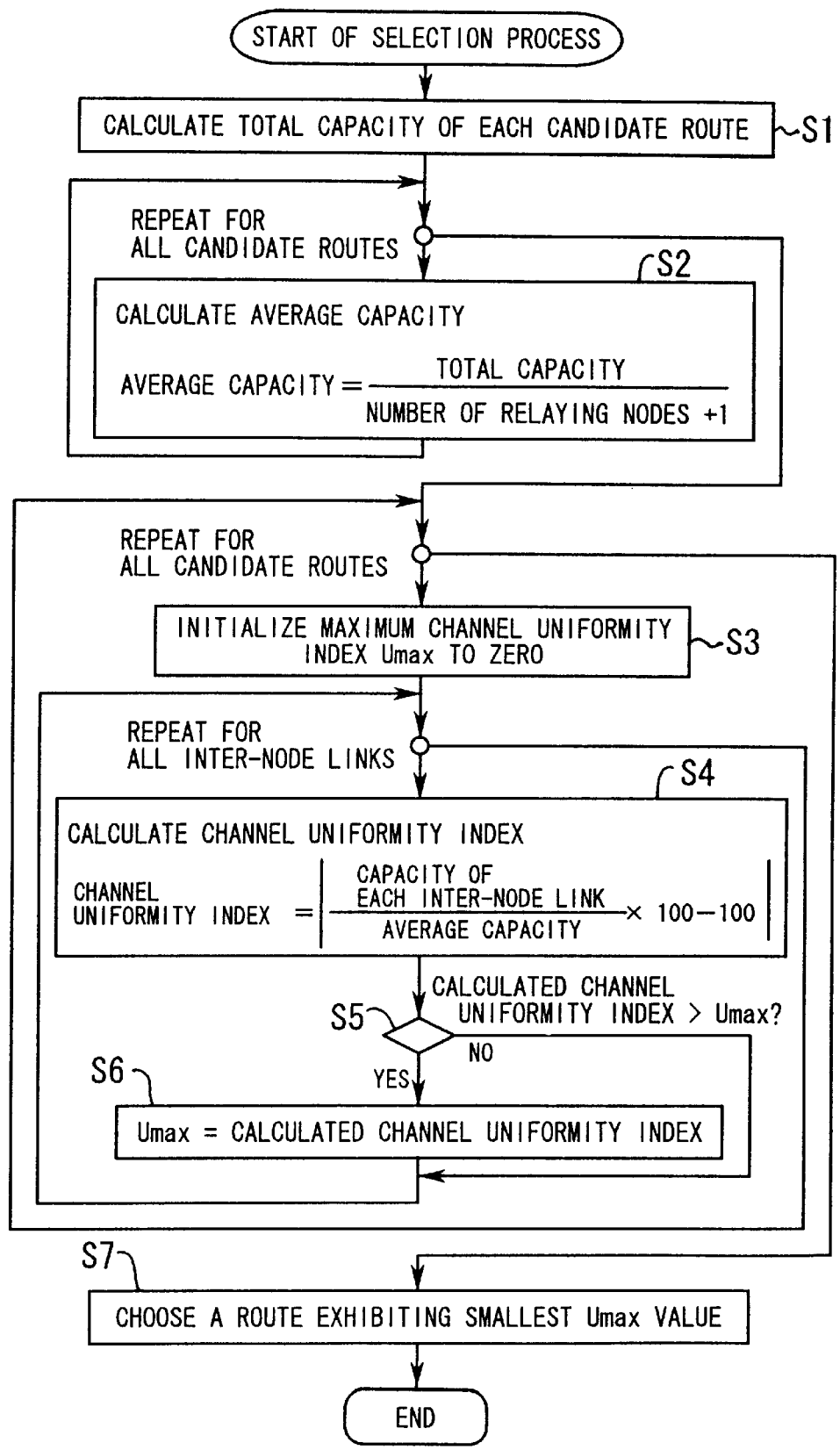
FIG. 5 is a flowchart showing a route selection process in the first embodiment of the present invention.

Referring next to FIG. 5, the following description will explain a route selection process performed by the RMG unit 11 shown in FIG. 2.

FIG. 5 is a flowchart showing a route selection process proposed in the first embodiment of the present invention. It should be noted here that, this flowchart omits the steps for total capacity-based route selection that should be performed in advance to the steps shown in the flowchart. That is, the RMG unit 11 first calculates the total channel capacity of a plurality of inter-node links constituting each possible route from the sending node to the receiving node, and it chooses the best candidate route(s) that exhibit the largest total capacity. The route selection process shown in FIG. 5 will follow this total capacity-based selection only when it failed to narrow down the candidate routes to one.

The route selection process is initiated when the network system is set up or the channel capacity is changed. A change of channel capacity happens in the case of: (1) addition or partial reduction of signaling links, (2) a trouble or shutdown in node equipment or channel, and (3) reception of an update request message from other nodes. The detailed procedure will be explained below according to the steps shown in FIG. 5. To make the description more specific, the following explanation will also refer to a fast packet-switched network of FIG. 6, where appropriate.

[S1] For each route from the sending node to the receiving node, the RMG unit 11 calculates the total channel capacity by summing up the capacities of a plurality of inter-node links that constitute the candidate route in process.

Figure 6:
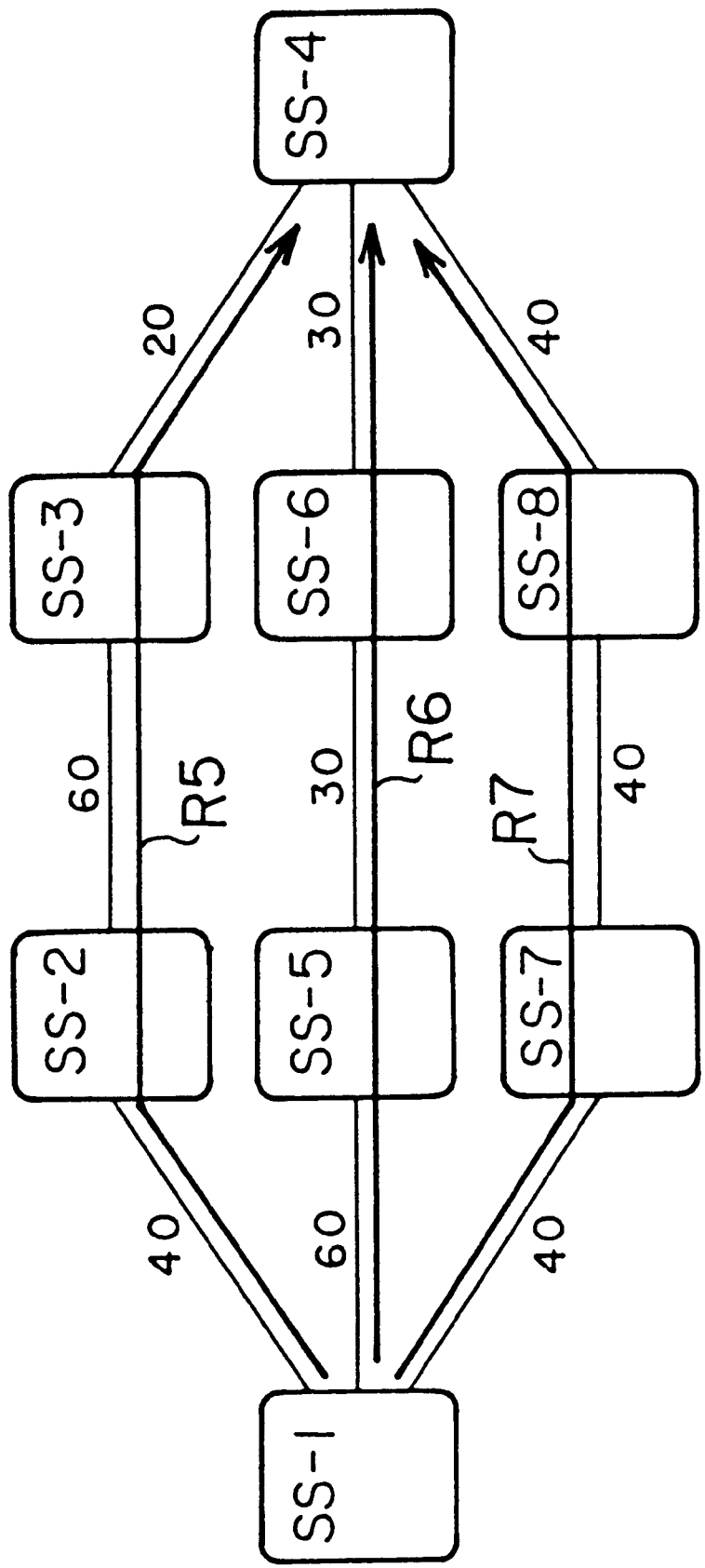
FIG. 6 is a diagram showing an example of a fast packet-switched network.

Referring to FIG. 6, the total channel capacity values are calculated as: 120 (i.e., 40+60+20) for the route R5, 120 (i.e., 60+30+30) for the route R6, 120 (i.e., 40+40+40) for the route R7. That is, all those three routes R5, R6, and R7 have the same valued of the total channel capacity. Now that the RMG unit 11 cannot determine the best route solely by evaluating the total channel capacities, the process advances to next step S2.

[S2] For each candidate route available, the RMG unit 11 divides its total channel capacity calculated in step S1 by the number of relaying nodes plus one (or the number of inter-node links), thereby yielding the average channel capacity of each route. The RMG unit 11 repeats this calculation for all the candidate routes.

Specifically, the candidate routes in FIG. 6 all exhibit the same average value 40, i.e., 120÷(2+1).

[S3] For each candidate route, the RMG unit 11 introduces an index number named "maximum channel uniformity index (Umax)" and assigns zero to it as an initial value. This index number Umax is defined as the maximum value of channel uniformity index calculated for every inter-node link as part of a candidate route.

[S4] The RMG unit 11 calculates the channel uniformity index of an inter-node link by: (1) dividing the channel capacity of the link by the average channel capacity of the candidate route which was calculated in step S2, (2) multiplying the quotient by 100, (3) subtracting 100 from the product, and (4) obtaining an absolute value of the remainder.

Note here that the value obtained through those operations actually indicates the degree of "deviation" of each channel capacity with respect to the average capacity. However, this value is referred to as the channel uniformity index throughout the flowchart of FIG. 5. By such definition, reciprocals of the channel uniformity indexes show the uniformity in a literal sense. To be more specific, smaller values of the channel uniformity index indicate that the subject inter-node links have near-average capacity values (i.e., higher uniformity), and larger values in turn represent that the channel capacities of the inter-node links are far different from the average capacity of that route (i.e., lower uniformity).

Regarding the inter-node link between the nodes SS-1 and SS-2 as part of the candidate route R5 illustrated in FIG. 6, its channel uniformity index is evaluated as zero (i.e., $|(40 \div 40) \times 100 - 100|$). In contrast to this, the channel uniformity indexes of the other two inter-node links of the same candidate route R5 are both 50 (i.e., $|(60 \div 40) \times 100 - 100|$ for the link between SS-2 and SS-3 and $|(20 \div 40) \times 100 - 100|$ for the link between SS-3 and SS-4).

[S5] The RMG unit 11 then compares the channel uniformity index obtained in step S4 with the present value of the maximum channel uniformity index Umax. If the channel uniformity index is greater than the present value of Umax, the process advances to step S6. If the channel capacity is not greater than the present value of Umax, the process skips step S6 and returns to step S4 to process the next inter-node link.

[S6] The RMG unit 11 substitutes the channel uniformity index calculated in step S4 for the maximum channel uniformity index Umax.

The above steps S4–S6 are repeated as a minor loop for all the inter-node links contained in a specific candidate route, and the resultant value of maximum channel uniformity index Umax is regarded as the definite maximum channel uniformity index of that candidate route.

Furthermore, the above-described steps S3–S6 are repeated as a major loop to process all the candidate routes, allowing the maximum channel uniformity index values of all the candidate routes to become ready for comparison.

Refer to the route R5 in FIG. 6 again. Because the channel uniformity index "50" of the inter-node link between the nodes SS-2 and SS-3 is larger than the present maximum channel uniformity value "zero," the maximum channel uniformity index Umax will have a new value "50. Likewise, the maximum channel uniformity index of the route R6 is evaluated as "50," and that of the route R7 is evaluated as "0.

[S7] From among all the candidate routes examined, the RMG unit 11 chooses one best route that exhibits the highest uniformity, or more specifically, the smallest value of the maximum channel uniformity index.

In the network of FIG. 6, the route R7 with the maximum channel uniformity index "0" will be finally chosen by the RMG unit 11. The selected route R7 is composed of uniform inter-node links all having the same channel capacity "40." On the other hand, the other routes R5 and R6 include some inferior links with a smaller capacity such as "20" or "30," which will limit the performance of those routes. The RMG unit 11 made a reasonable decision because the route R7 is the most capable in carrying packets to the destination node SS-4.

Figure 7:
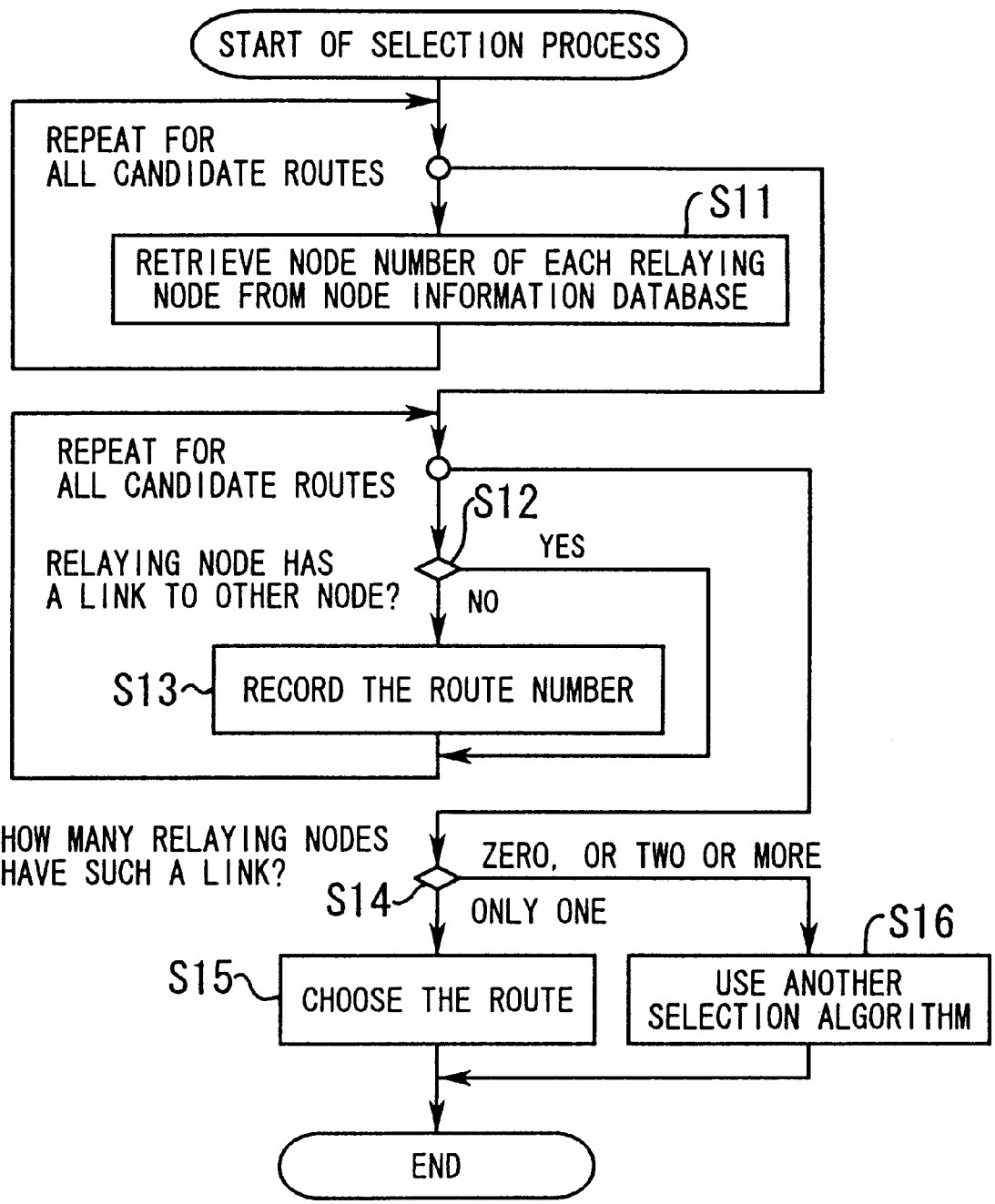
FIG. 7 is a flowchart showing a route selection process in a second embodiment of the present invention.
Figure 8:
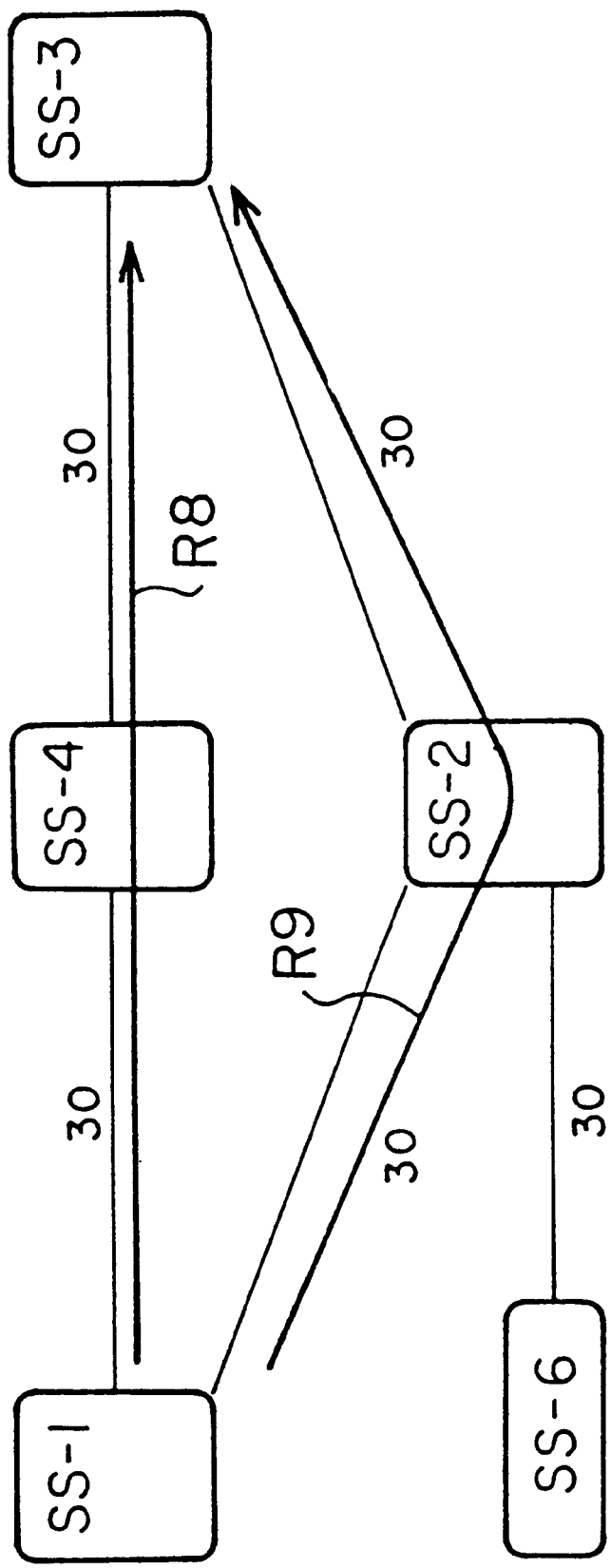
FIG. 8 is a diagram showing an example of a fast packet-switched network.

Referring next to FIGS. 7 and 8, a second embodiment will be explained below. This second embodiment has the same structure as that of the first embodiment shown in FIG. 2 and FIG. 3, and it differs from the first embodiment only in the route selection procedure performed by the RMG unit. Therefore, the following description will focus on the difference in that process.

FIG. 7 is a flowchart showing a route selection process performed by the RMG unit. It should be noted here that this flowchart omits the steps for total capacity-based route selection that should be performed in advance to the steps of this flowchart. That is, the RMG unit first calculates the total channel capacity of a plurality of inter-node links constituting each possible route from the sending node to the receiving node, and selects the best candidate route(s) exhibiting the largest total capacity. The route selection process shown in FIG. 7 will be executed only when this capacity-based route selection has failed to narrow down the candidates to one.

The route selection process is initiated when the network system is set up or the channel capacity is changed. The detailed procedure will be explained below according to the steps shown in FIG. 7. The following explanation of process steps will refer to a fast packet-switched network of FIG. 8, where appropriate, to provide more specific description.

[S11] For each candidate route, the RMG unit retrieves the node numbers of the relaying nodes located on the route by searching the node information database. This retrieval is repeated for all the candidate routes.

In FIG. 8, the RMG unit obtains the node number of the relaying node SS-4 on the route R8 and that of the relaying node SS-2 on the route R9.

[S12] For each candidate route, the RMG unit examines whether or not the relaying nodes found in step 11 are also linked to any other node that does not belong to the candidate route presently concerned. If the candidate route contains no such relaying nodes (i.e., the candidate route is "independent"), the process advances to step S13. If any one of the relaying nodes has a link to other nodes off the route, the process skips step S13.

[S13] The RMG unit makes a record of the independent route(s) by storing their route numbers. The above steps S12 and S13 are repeated for all the candidate routes. In the example case shown in FIG. 8, only the number of the candidate route R8 is recorded.

[S14] Based on the route numbers recorded in step S13, the RMG unit examines how many independent routes are available. If only one route was found independent, the process advances to step S15. If two or more independent routes are found, or no independent route is found, the process branches to step S16.

[S15] The RMG unit chooses the sole independent route as the best route.

[S16] Since the above selection algorithm cannot narrow down the candidates to one, the RMG unit selects a route including a relaying node with the smallest node number, where the node numbers are serial numbers previously assigned to all the relaying nodes for identification purposes.

In the example case shown in FIG. 8, the RMG unit chooses the route RB, whose number is smaller than the other candidate's number, R9. As such, the second embodiment selects the independent route R8, while rejecting the route R9 which may be affected by some packet traffic from the node SS-6. This selection algorithm provides packet transmission with improved stability.

Figure 9:
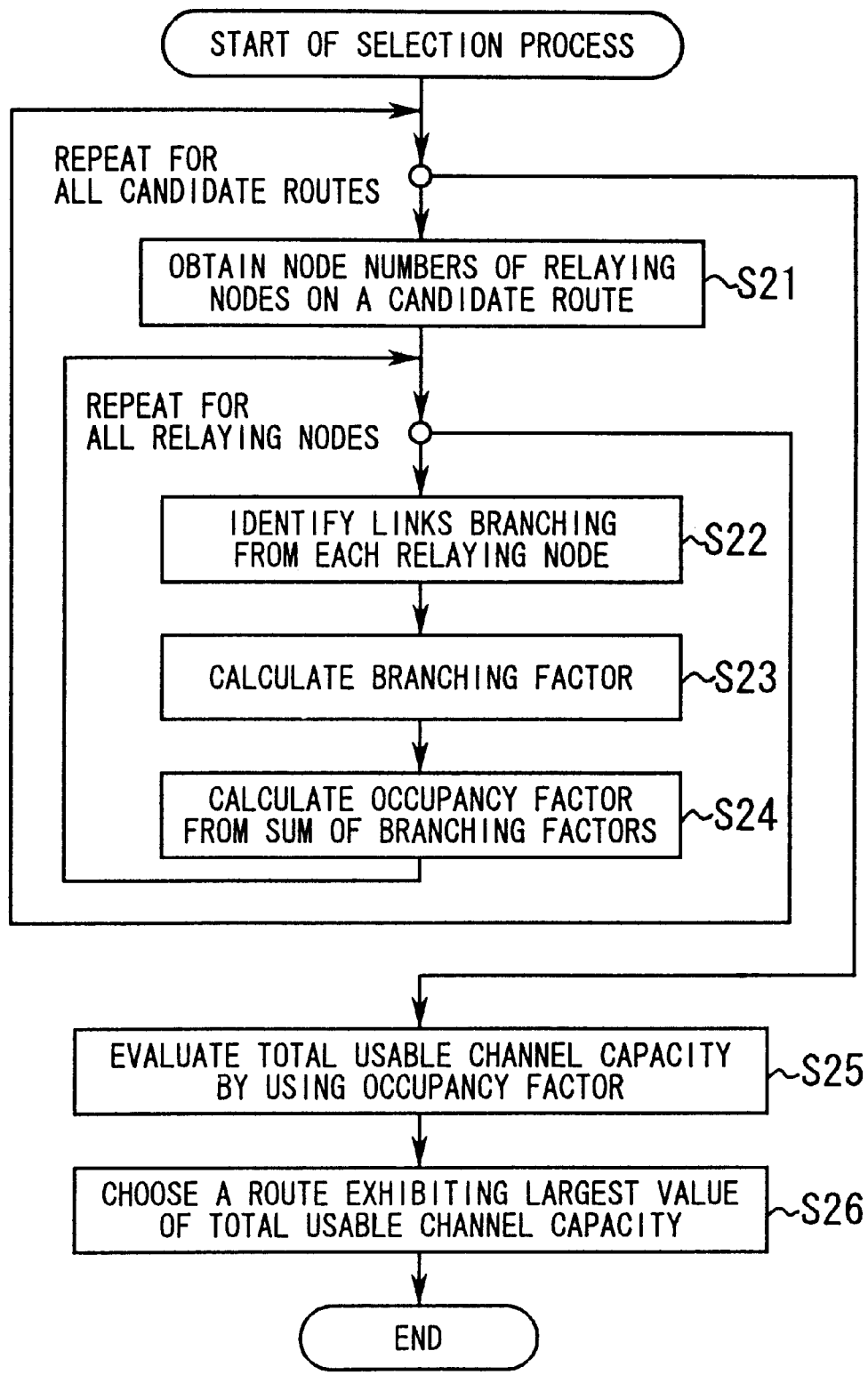
FIG. 9 is a flowchart showing route selection process in a third embodiment of the present invention.
Figure 10:
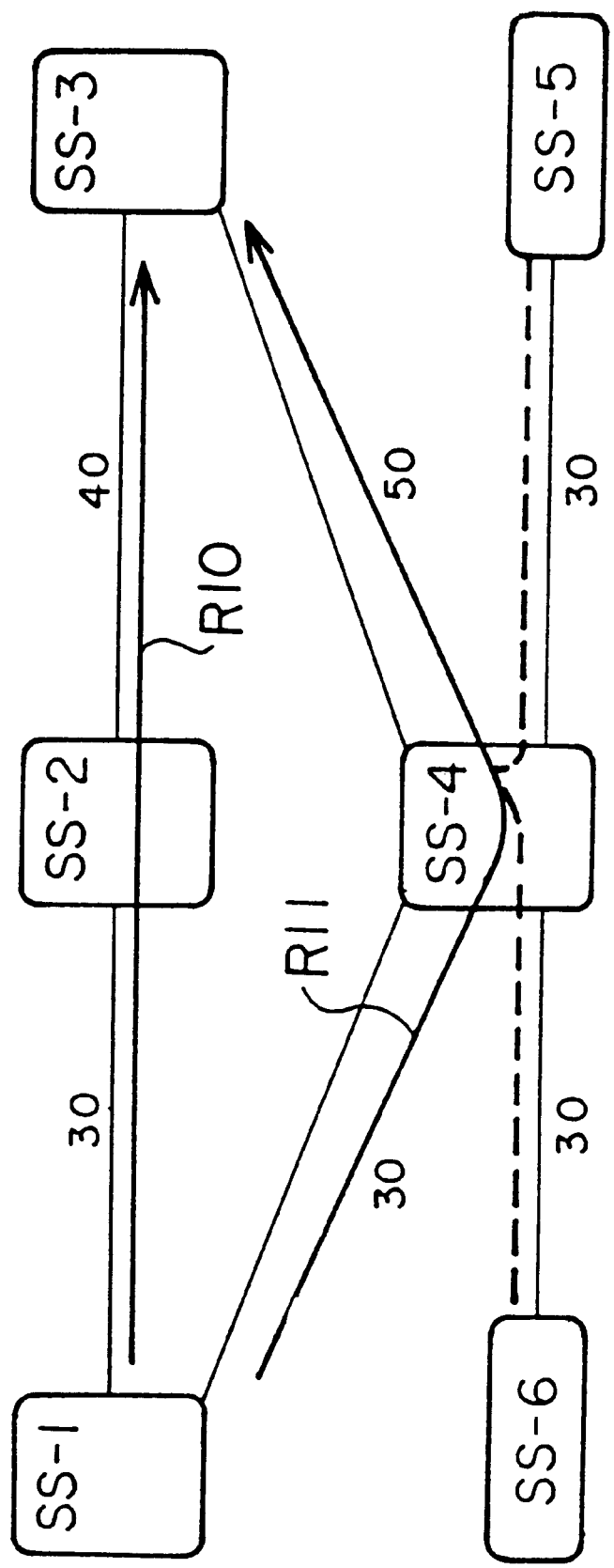
FIG. 10 is a diagram showing an example of a fast packet-switched network.

Referring next to FIGS. 9 and 10, a third embodiment will be explained below. This third embodiment has the same structure as that of the first embodiment shown in FIG. 2 and FIG. 3, and it differs from the first embodiment only in the route selection process performed by the RMG unit. Therefore, the following description will focus on the difference in the route selection process.

FIG. 9 is a flowchart showing a specific route selection process performed by the RMG unit. When the network system is set up or the channel capacity is changed, the RMG unit executes this process after collecting the information on channel capacity. Detailed procedure will be explained below according to the steps of the flowchart, with reference to a fast packet-switched network illustrated in FIG. 10 to make the explanation more specific.

[S21] For each candidate route, the RMG unit identifies the relaying nodes located on the route by retrieving their node numbers from the node information database.

More specifically, in FIG. 8, the RMG unit obtains the node number of the relaying node SS-2 on the route R10 and that of the relaying node SS-4 on the route R11.

[S22] For each relaying node on a candidate route, the RMG unit examines whether or not the relaying node has an extra link branching off toward another node that does not belongs to the candidate route presently concerned. If such a relaying node and branching link(s) are found, the RMG unit investigates the node at the other end of the branching link and obtains its node number and the channel capacity of the branching link.

In the example shown in FIG. 10, the candidate route R11 has two links that branch off at the relaying node SS-4, while the other candidate route R10 goes straight to the receiving node SS-3 without having branching links. The RMG unit learns that the two branching links reach the nodes SS-6 and SS-5 and obtains their respective node numbers, as well as identifying the channel capacity "30" of both links.

[S23] The RMG unit calculates a special factor to show how much the branching link will affect the traffic on the candidate route, which factor is referred to as a "branching factor." In the case that a relaying node has a plurality of branching links, the branching factor is calculated individually for each branching link.

More specifically, the traffic originating from the node SS-6 will affect the traffic on the inter-node link between the nodes SS-4 and SS-3 as part of the candidate route R11. Here, the degree of affection, or the branching factor, is calculated as follows.

First, the RMG unit accumulates each channel capacity of all inter-node links between the relaying node SS-4 and the nodes SS-1, SS-3, and SS-5, thereby obtaining the total capacity "110" (i.e., 30+50+30). Based on this total capacity "110," the RMG unit calculates a fraction of the channel capacity of the inter-node link from the node SS-6 to the node SS-4 as $$30\times(50\div110)=14,$$

where the dividend "50" is the capacity of the link between the nodes SS-4 and SS-3. The resultant value "14" is the branching factor of the node SS-6.

In the same way, the branching factor of the node SS-5 is calculated as $$30\times(50\div110)=14,$$

where the multiplicand "30" is the channel capacity between the nodes SS-5 and SS-4 and the dividend "50" is the channel capacity between the nodes SS-4 and SS-3. The calculated value "14" is an estimate of the traffic that originates from the node SS-5 and branches off at the node SS-4 toward the node SS-3, and thus it indicates how much the node SS-5 will affect the traffic between the nodes SS-4 and SS-3.

[S24] According to the branching factor obtained in step S23, the RMG unit calculates an occupancy factor that indicates how much the relaying node can use the channel capacity of the candidate route.

More specifically, the sending node SS-1 has a link with channel capacity "30" to reach the relaying node SS-4, and it is assumed that this traffic will occupy the channel capacity "50" between the nodes SS-4 and SS-3 to some extent. Meanwhile, the traffic from the neighboring nodes SS-5 and SS-6 are expected to affect somehow the traffic on the link between the nodes SS-4 and SS-3. The degree of this affection can be expressed as a sum of the individual branching factors obtained in the previous step S23, and specifically, it is calculated as $$14+14=28,$$

where the first and second terms on the left part are the branching factors of the nodes SS-5 and SS-6, respectively.

Now that the affection from the neighboring nodes SS-5 and SS-6 is understood, the RMG unit estimates how much the traffic from the node SS-1 can use the channel capacity of the link from the node SS-4 to the node SS-3. That is, the occupancy factor is obtained as $$50\times\{30\div(28+30)\}=26.$$

The above steps S22–S24 are applied to all relaying nodes which were identified in step S21, and further to all candidate routes between the sending node and receiving node.

[S25] Based on the occupancy factors calculated in step S24, the RMG unit accumulates the channel capacity of each inter-node link along a candidate route from the sending node to the receiving node, thereby yielding the total "usable" channel capacity of that candidate route.

In the case of FIG. 10, the total usable channel capacity of the candidate route R11 is "56" (i.e., 30+26) and that of the other candidate route R10 is "70" (i.e., 30+40).

[S26] The RMG unit compares the obtained values of total usable channel capacity with one another to find the best route that exhibits the largest total usable channel capacity.

In the example case shown in FIG. 10, the RMG unit chooses the route R10 as the best route. Note that this choice is quite different from what would be chosen by the conventional total capacity-based route selection algorithm which evaluates only a simple summation of channel capacities of each route. As opposed to that, the RMG unit in this embodiment selected the route R10 as the best route, while considering some estimated traffic inflow toward the route R11 from the neighboring nodes SS-5 and SS-6, which is expected to affect the traffic of the route R11 This improved selection algorithm promises more stable packet transmission.

Figure 11:
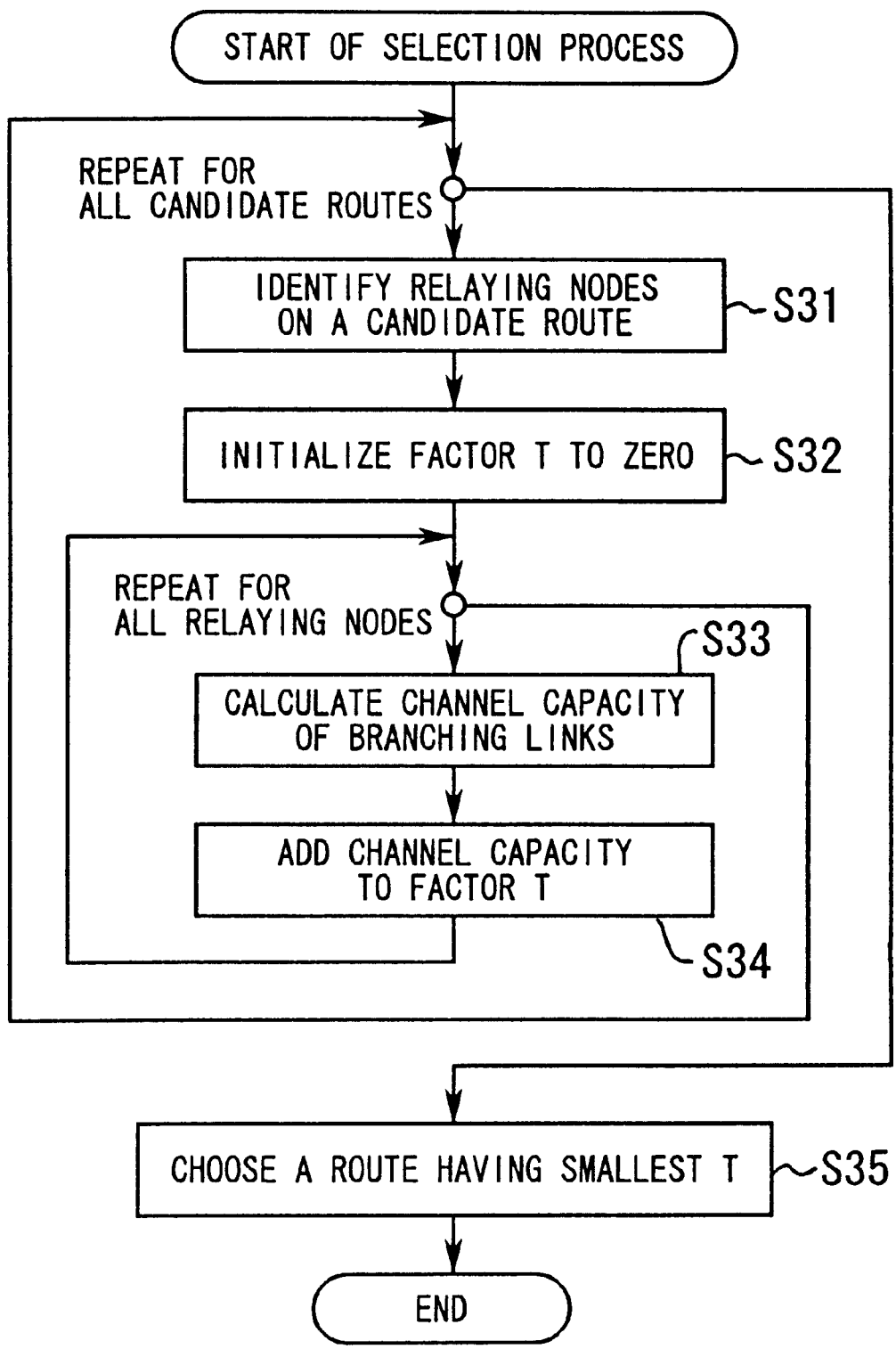
FIG. 11 is a flowchart showing a route selection process in a fourth embodiment of the present invention.
Figure 12:
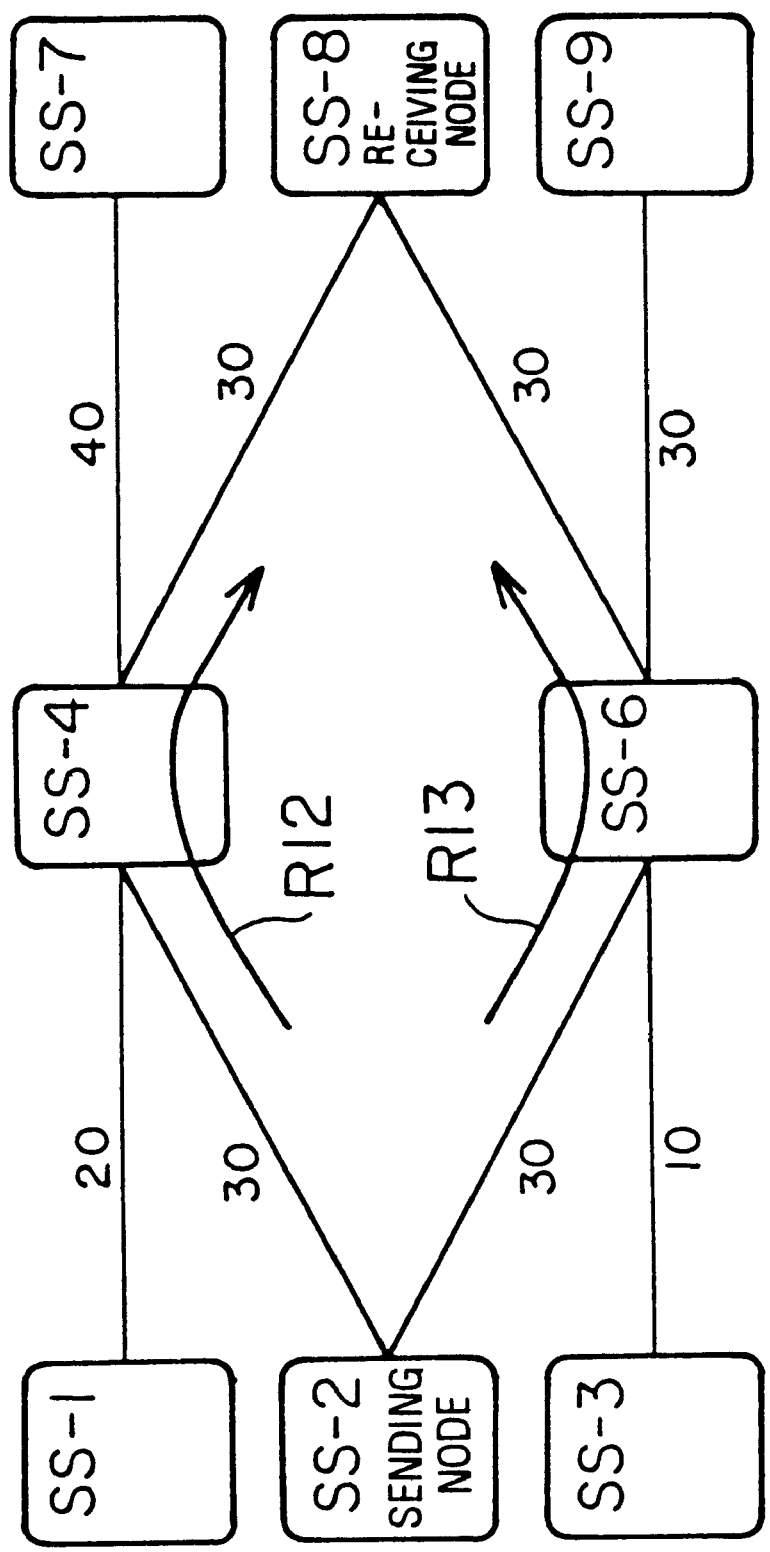
FIG. 12 is a diagram showing an example of a fast packet-switched network.

Referring next to FIGS. 11 and 12, a fourth embodiment of the present invention will be explained below. This fourth embodiment has the same structure as that of the first embodiment shown in FIGS. 2 and 3. Since it differs from the first embodiment only in the route selection process performed by the RMG unit, the following description will focus on this difference.

FIG. 11 is a flowchart showing a route selection procedure performed by the RMG unit. It should be noted here that this flowchart omits the steps for a total capacity-based route selection that should be performed in advance to the steps shown in the flowchart. More specifically, for each candidate route, the selection process sums up the channel capacities of all inter-node links of the route, and chooses the route(s) that exhibit the largest total channel capacity. The RMG unit executes the route selection process shown in FIG. 11 only when this total capacity-based route selection has failed to narrow down the candidates to one.

The route selection process is initiated when the network system is set up or the channel capacity is changed. Detailed procedure will be explained below according to the sequence of steps as in FIG. 11. The explanation will also refer to FIG. 12 as an example of a fast packet-switched network to provide more specific description where appropriate.

[S31] For each candidate route, the RMG unit identifies every relaying node located between the sending node and the receiving node.

In the example case shown in FIG. 12, the RMG unit identifies a node SS-4 on the route R12 and SS-6 on the route R13 as relaying nodes.

[S32] The RMG unit defines an index named "factor T" for each candidate route, which is initialized to zero.

[S33] For each relaying node identified in step S31, the RMG unit examines whether or not the relaying node has a link branching toward another node that does not belongs to the candidate route presently concerned. If such a relaying node and branching link(s) are found, the RMG unit obtains the channel capacity of each branching link.

More specifically, the relaying node SS-4 on the candidate route R12 has two such links to the neighboring nodes SS-1 and SS-7 and their respective channel capacities are "20" and "40." Regarding the other candidate route R13, the relaying node SS-6 has branching links to the neighboring nodes SS-3 and SS-9, whose respective channel capacities are "10" and "30".

[S34] The values of channel capacity obtained in step S33 are accumulated to the factor T corresponding to each route.

In the case of the network shown in FIG. 12, the factor T for the route R12 is "60" (i.e., 20+40), and that for the route R13 is "40" (i.e., 10+30).

The RMG unit repeats the above steps S33 and S34 for all the relaying nodes identified in step S31. Furthermore, the RMG unit repeats the whole steps S31 to S34 for every candidate route, thereby yielding the T values for all the candidate routes.

[S35] Lastly, the RMG unit compares the factor T values with one another to choose the best route that exhibits the smallest value of factor T.

In FIG. 12, the route R13 is chosen as the best route, because the traffic inflow to the route R13 via the relaying node SS-6 is smaller than that to the route R12. This selection algorithm avoid traffic congestion and thus allows more stable packet transmission.

Figure 13:
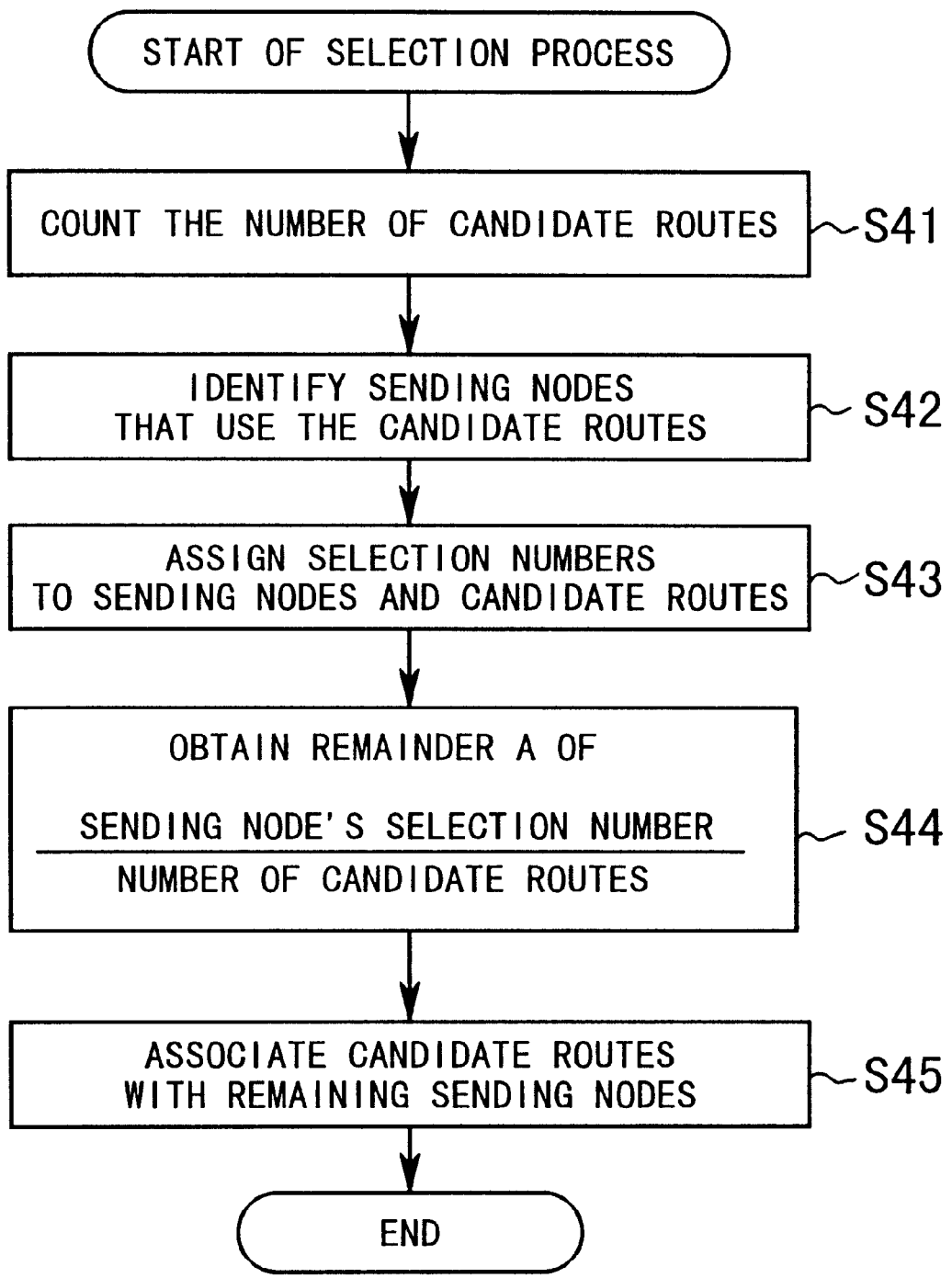
FIG. 13 is a flowchart showing a route selection process in a fifth embodiment of the present invention.
Figure 14:
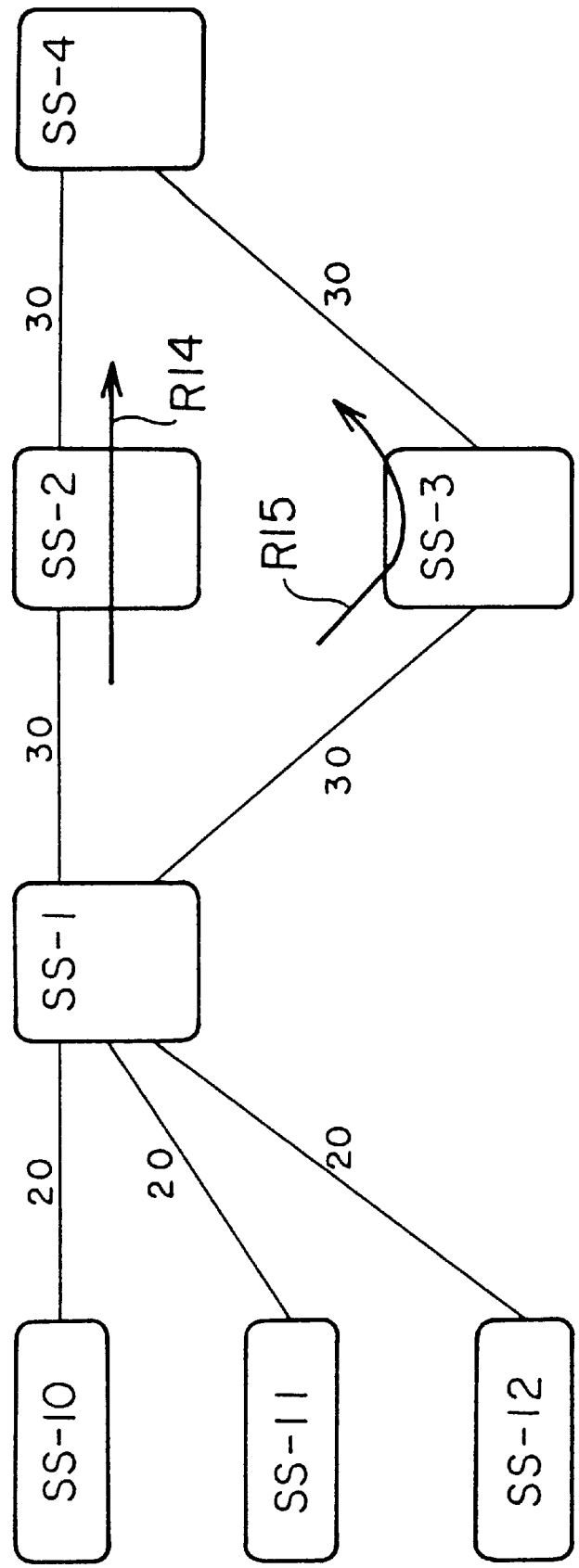
FIG. 14 is a diagram showing an example of a fast packet-switched network.

Referring next to FIGS. 13 and 14, a fifth embodiment of the present invention will be explained below. This fifth embodiment has the same structure as that of the first embodiment shown in FIGS. 2 and 3. Since it differs from the first embodiment only in the route selection process performed by the RMG unit, the following description will focus on this difference.

FIG. 13 is a flowchart showing a route selection procedure performed by the RMG unit. It should be noted here that this flowchart omits a process of a total capacity-based route selection that should be executed in advance to the steps shown in the flowchart. More specifically, for every candidate route, the RMG unit sums up the channel capacities of inter-node links on the route, and chooses the route(s) that exhibit the largest total channel capacity. The RMG unit then starts the route selection process of FIG. 13 only when this capacity-based route selection has failed to narrow down the candidates to one.

The route selection process is initiated when the network system is set up or the channel capacity is changed. The detailed procedure will be explained below according to the sequence of steps shown in FIG. 13. The explanation will also refer to FIG. 14 as an example of a fast packet-switched network to provide more specific description where appropriate.

[S41] The RMG unit counts the number of candidate routes that have passed the total capacity-based route selection process executed in advance to this step.

In the example case shown in FIG. 14, the total capacity-based selection process yields candidate routes R14 and R15, and thus the number of candidate routes is two.

[S42] From the node directory data, the RMG unit identifies the potential sending nodes that may use those candidate routes to transfer packets.

The nodes SS-10, SS-11, and SS-12 in FIG. 14 are regarded as the potential sending nodes.

[S43] The RMG unit assigns serial selection numbers ([1], [2], [3], ...) to the candidate routes identified in step S41, in ascending sequence of the node number of relaying nodes included in the candidate routes. Further, the RMG unit assigns serial selection numbers ([1], [2], [3], ...) to the sending nodes identified in step S42, in ascending sequence of their node numbers.

More specifically, the route R14 obtains a selection number [1], while the route R15 obtains a selection number [2]. On the other hand, the sending nodes SS-10, SS-11, and SS-12 obtain selection numbers [1], [1], and [3], respectively.

[S44] If the number of routes obtained in step S41 is not smaller than the number of sending nodes obtained in step S42, the RMG unit associates the sending nodes with the routes based on the direct correspondence of their respective selection numbers. Each sending node are then allowed to use the assigned route to transmit packets.

If the number of routes in turn is smaller than the number of sending nodes, the RMG unit first associates the sending nodes having smaller selection numbers to the available routes based on the direct correspondence of their respective selection numbers. The RMG unit then divides the selection number of each remaining sending node by the number of routes obtained in step S41, thereby yielding the remainder value A.

In the example shown in FIG. 14, the number of available routes is smaller than the number of sending nodes. Therefore, the RMG unit assigns the sending node SS-10 with selection number [1] to the route R14 with selection number [1], and the sending node SS-11 with selection number [2] to the route R15 with selection number [2]. The RMG unit then divides the selection number "3" of the sending node SS-12 by the number of routes "2" and obtains the remainder A as "1."

[S45] The RMG unit associates each remaining sending node to one of the routes so that the remainder value A of the sending node will match with the selection number of the route to be assigned. When the calculated remainder A is zero, that sending node is assigned to the route having the largest selection number. The sending nodes are now allowed to use the assigned routes to transmit packets.

In the example case shown in FIG. 14, the sending node SS-12 with selection number [3] is assigned to the route 14 with selection number [1].

In the way described above, the fifth embodiment selects the routes so that the packets from a plurality of sending nodes will not rush into a single route, such as the route R14, but will be distributed to two or more routes having the same capacity, such as the routes R14 and R15. As such, this route selection algorithm prevents the traffic load from being concentrated to a particular route among those having equal conditions.

Figure 15:
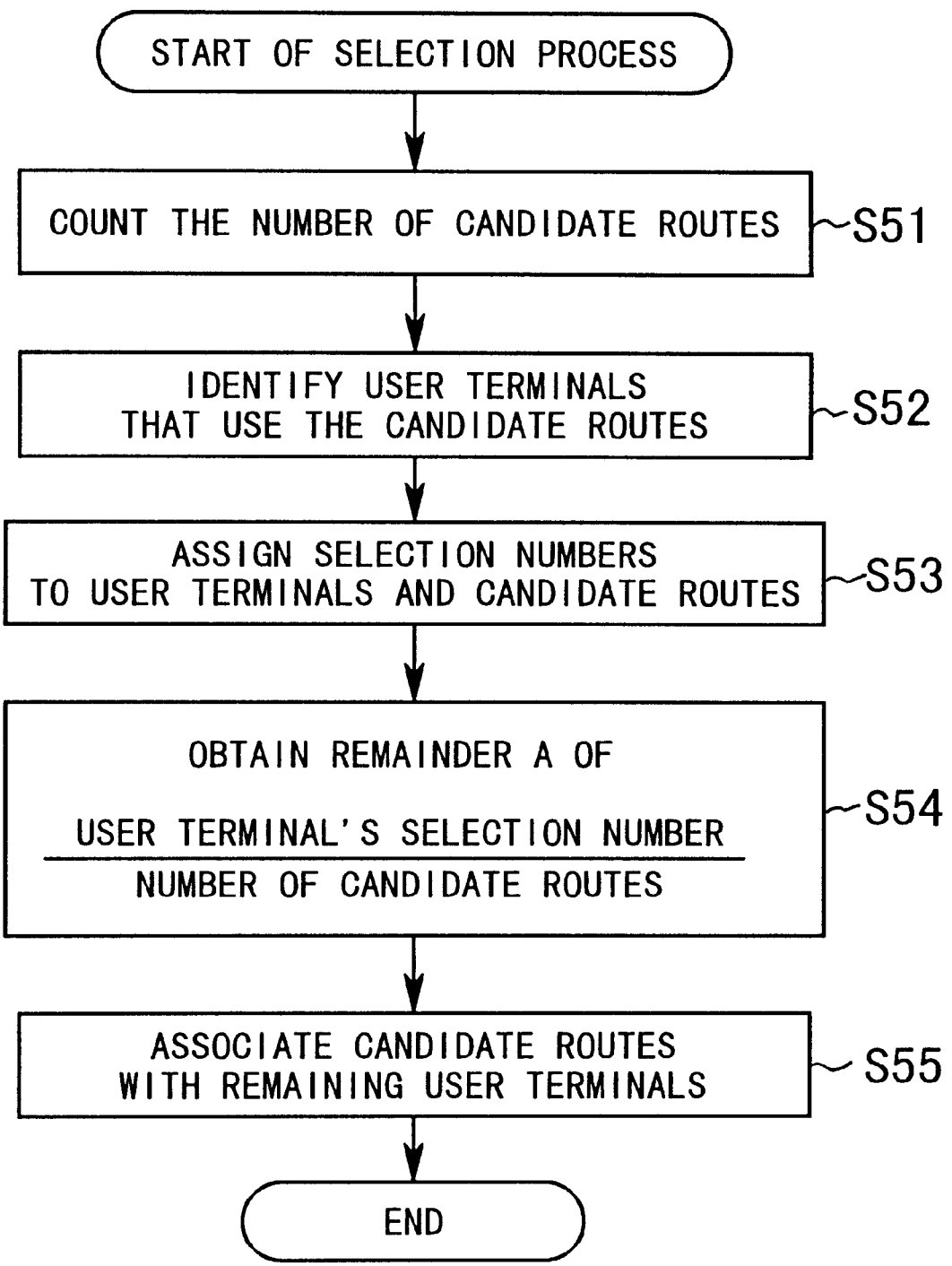
FIG. 15 is a flowchart showing a route selection process in a sixth embodiment of the present invention.
Figure 16:
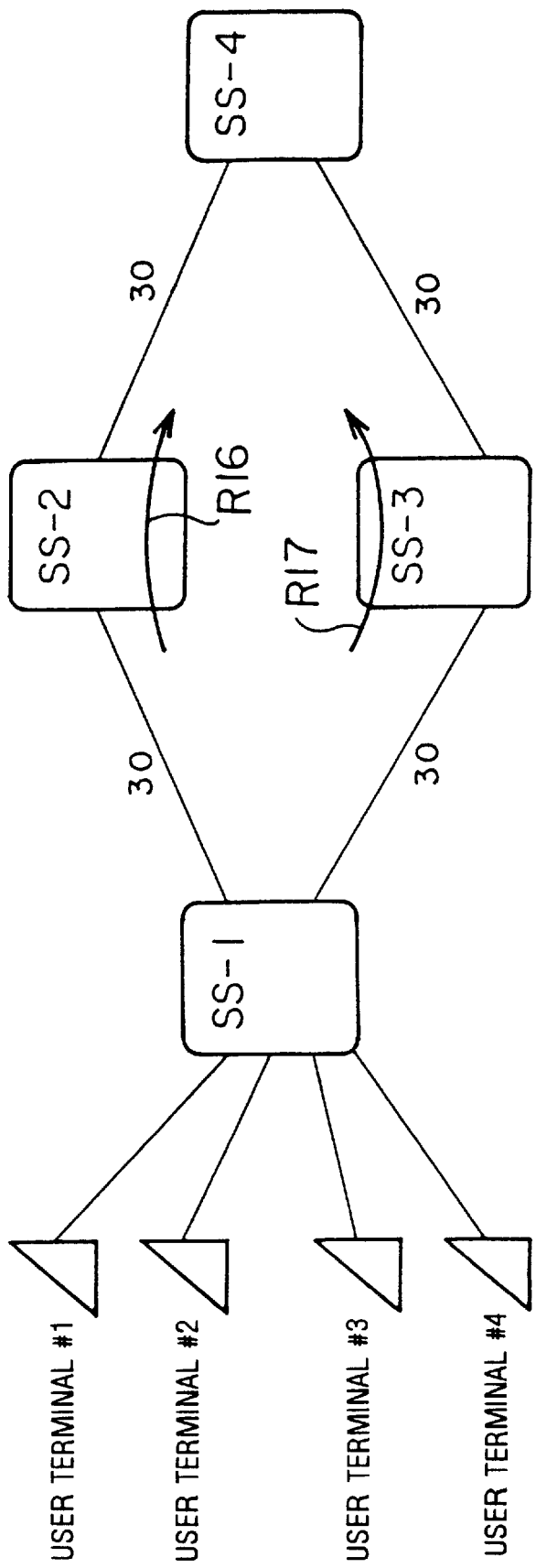
FIG. 16 is a diagram showing an example of fast packet-switched network.

Referring next to FIGS. 15 and 16, a sixth embodiment of the present invention will be explained below. This sixth embodiment has the same structure as that of the first embodiment shown in FIGS. 2 and 3. Since it differs from the first embodiment only in the route selection process performed by the RMG unit, the following description will focus on this difference.

FIG. 15 is a flowchart showing a route selection process performed by the RMG unit. It should be noted here that this flowchart omits a process of capacity-based route selection that should be executed in advance to the steps of this flowchart. More specifically, for every candidate route, the RMG unit sums up the channel capacities of inter-node links on the route, and chooses the route(s) that exhibit the largest total channel capacity. The RMG unit starts the route selection process of FIG. 15 only when this total capacity-based route selection has failed to narrow down the candidates to one.

The route selection process is initiated when the network system is set up or the channel capacity is changed. The detailed procedure will be explained below according to the sequence of steps shown in FIG. 15. The explanation will also refer to FIG. 16 as an example of a fast packet-switched network to provide more specific description where appropriate.

[S51] The RMG unit counts the number of candidate routes that have passed the total capacity-based route selection process executed in advance to this step.

In the example case shown in FIG. 16, the total capacity-based selection process yields two candidate routes R16 and R17 having the same total channel capacity; accordingly, the number of routes is two. [S52] From the node directory data, the RMG unit identifies local user terminals that may use those routes for packet transmission.

In the example case shown in FIG. 16, four user terminals #1 to #4 are identified.

[S53] The RMG unit assigns serial selection numbers ([1], [2], [3], . . . ) to the candidate routes identified in step S51, in ascending sequence of the node numbers of relaying nodes included in the candidate routes. Further, the RMG unit assigns serial selection numbers ([1], [2], [3], . . . ) to the user terminals identified in step S52, in ascending sequence of their respective terminal numbers.

In FIG. 16, the route R16 shown is assigned a selection number [1], while the other route R17 is assigned a selection number [2]. On the other hand, the user terminals #1 to #4 are assigned selection numbers [1] to [4], respectively.

[S54] If the number of candidate routes obtained in step S51 is not smaller than the number of user terminals obtained in step S52, the RMG unit associates the user terminals with the candidate routes based on the direct correspondence of their selection numbers. The user terminals are then allowed to use the assigned routes to transmit packets.

If the number of candidate routes in turn is smaller than the number of user terminals, the RMG unit first associates the user terminals having younger selection numbers with the available candidate routes based on the direct correspondence of their respective selection numbers. Subsequently, the RMG unit divides the selection number of each remaining user terminal by the number of candidate routes obtained in step S51, thereby yielding the remainder value A.

In the example case shown in FIG. 16, the number of candidate routes "2" is smaller than the number of user terminals "4." Therefore, the RMG unit assigns the user terminal #1 with selection number [1] to the route R16 with selection number [1], and the user terminal #2 with selection number [2] to the route R17 with selection number [2]. The RMG unit then divides the selection number [3] of the user terminal #3 by the number of routes "2" and obtains the remainder A as "1." The RMG unit further divides the selection number [4] of the user terminal #4 by the number of routes "2", thereby yielding a remainder A as "0."

[S55] The RMG unit associates each remaining user terminal to one of the routes so that the remainder value A of the user terminal will match with the selection number of the route. If the calculated remainder A is zero, that user terminal is assigned to the candidate route having the largest selection number. The user terminals use their respective routes to transmit packets.

In the example case shown in FIG. 16, the RMG unit assigns the route R16 with selection number [1] to the user terminal #3 with selection number [3], and assigns the route R17 with selection number [2] to the user terminal #4 with selection number [4].

In the way described above, the sixth embodiment selects the routes so that the packets from a plurality of user terminals will not rush into a single route, such as the route R16, but will be distributed to two or more routes having the same capacity, such as the routes R16 and R17. This route selection algorithm prevents the traffic load from being concentrated to a particular route among those having equal conditions.

Figure 17:
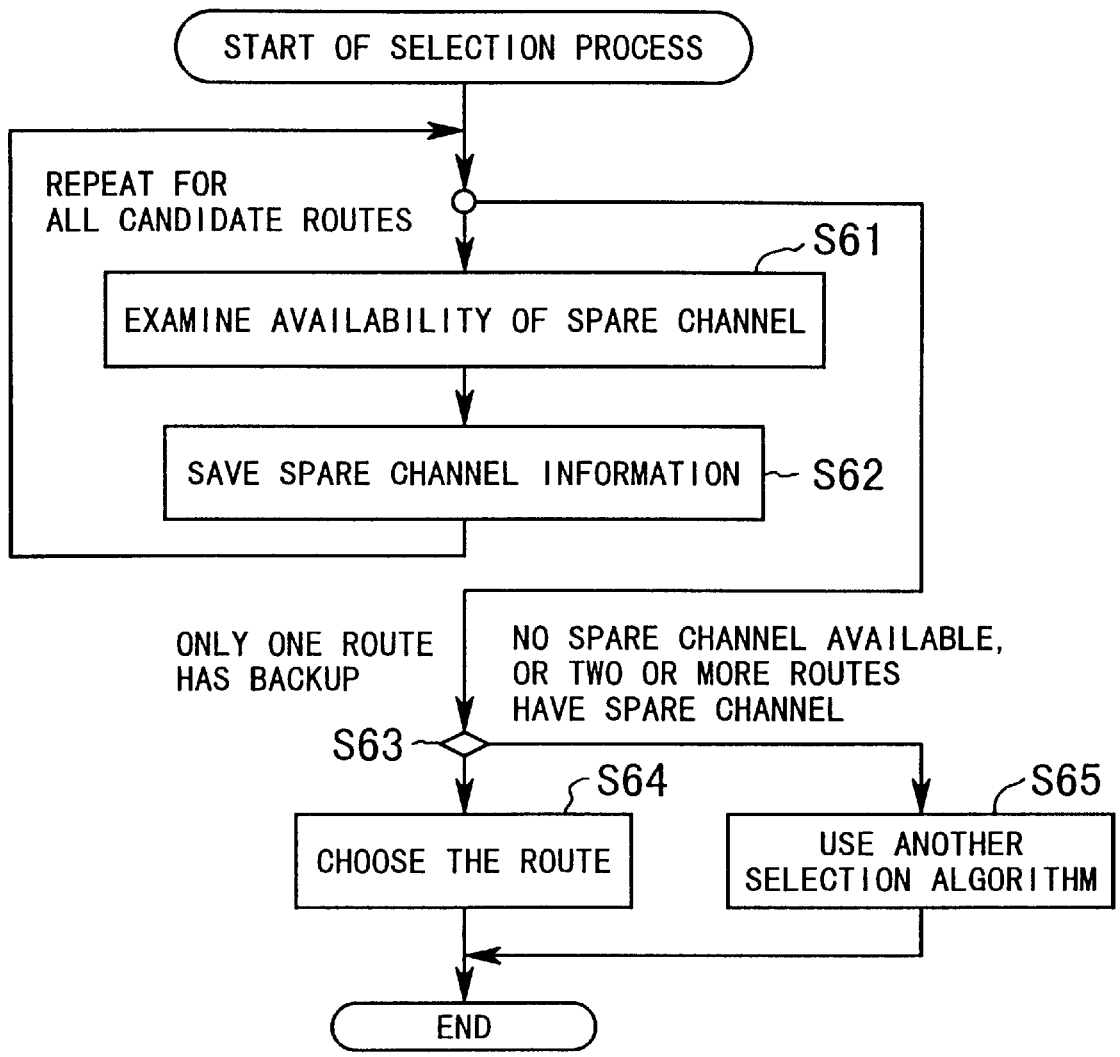
FIG. 17 is a flowchart showing a route selection process in a seventh embodiment of the present invention.
Figure 18:
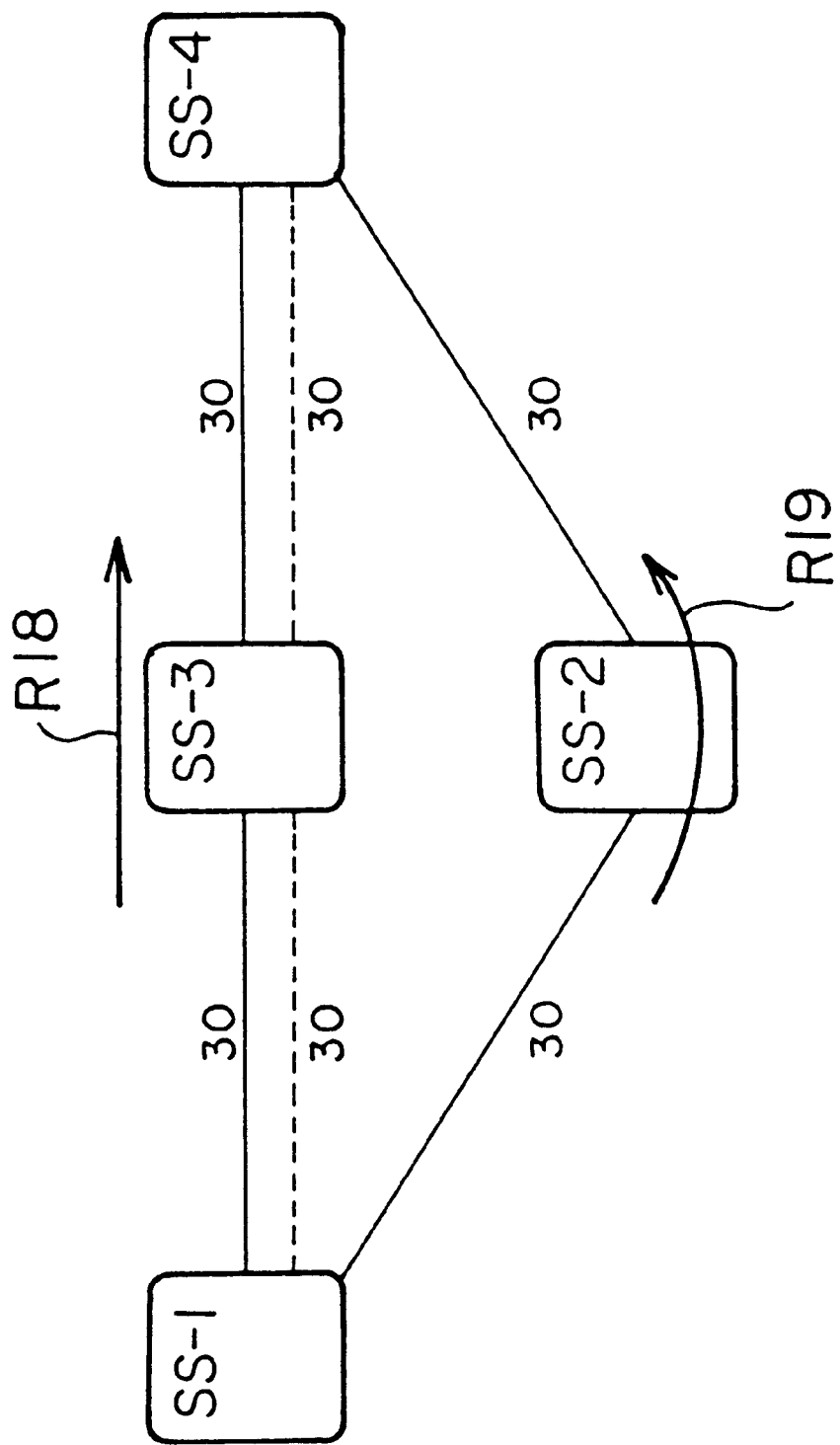
FIG. 18 is a diagram showing an example of a fast packet-switched network.

Referring next to FIGS. 17 and 18, a seventh embodiment of the present invention will be explained below. This seventh embodiment has the same structure as that of the first embodiment shown in FIGS. 2 and 3. Since it differs from the first embodiment only in the route selection process executed by the RMG unit, the following description will focus on this difference.

FIG. 17 is a flowchart showing a route selection procedure performed by the RMG unit. It should be noted -here that this flowchart omits a process of a total capacity-based route selection that should be executed in advance to the steps of this flowchart. More specifically, for every candidate route, the RMG unit sums up the channel capacities of inter-node links on the route, and chooses the route(s) that exhibit the largest total channel capacity. The RMG unit starts the route selection process of FIG. 17 only when this total capacity-based route selection has failed to narrow down the candidates to one.

The route selection process is initiated when the network system is set up or the channel capacity is changed. The detailed procedure will be explained below according to the sequence of steps shown in FIG. 17. The explanation will also refer to FIG. 18 as an example of a fast packet-switched network to provide more specific description where appropriate.

[S61] For each candidate route, the RMG unit examines the node directory data to know whether the route has a spare channel or not. Spare channels are redundant communication channels that are reserved for use in the event of a fault that happened to main communication channels, or working channels. Some routes in the network are equipped with such a spare channel, and this step S61 examines the availability of spare channels in each candidate route.

[S62] The RMG unit records the spare channel information obtained in step S61.

The RMG unit repeats the above steps S61 and S62 for all the candidate routes available.

In the example in FIG. 18, a route R18 has a spare channel with capacity "30" as indicated by the broken lines, while the other route R19 does not. The spare channel is running in parallel with the working channel as indicated by the solid lines and will be activated if the working channel encountered trouble.

[S63] Based on the spare channel information recorded in step S62, the RMG unit learns how many candidate routes are equipped with a spare channel. If there exists only one route with a spare channel, the process advances to step S64. If there is no such a route or, in turn, there are two or more such routes, the process advances to step S65.

[S64] The RMG unit chooses the sole route as the best route.

[S65] Since the above selection algorithm cannot narrow down the candidates, the RMG unit selects a route including a relaying node with the smallest node number, where the node numbers are serial numbers previously assigned to all the relaying nodes for identification purposes.

In FIG. 18, the route R18 is chosen as the sole best route because it has a spare channel. In the way described above, the seventh embodiment chooses a route having a spare channel with a higher priority. This selection algorithm makes it possible to deliver packets to their destinations even if the working channels encountered trouble, thus allowing more reliable packet transmission.

Figure 19:
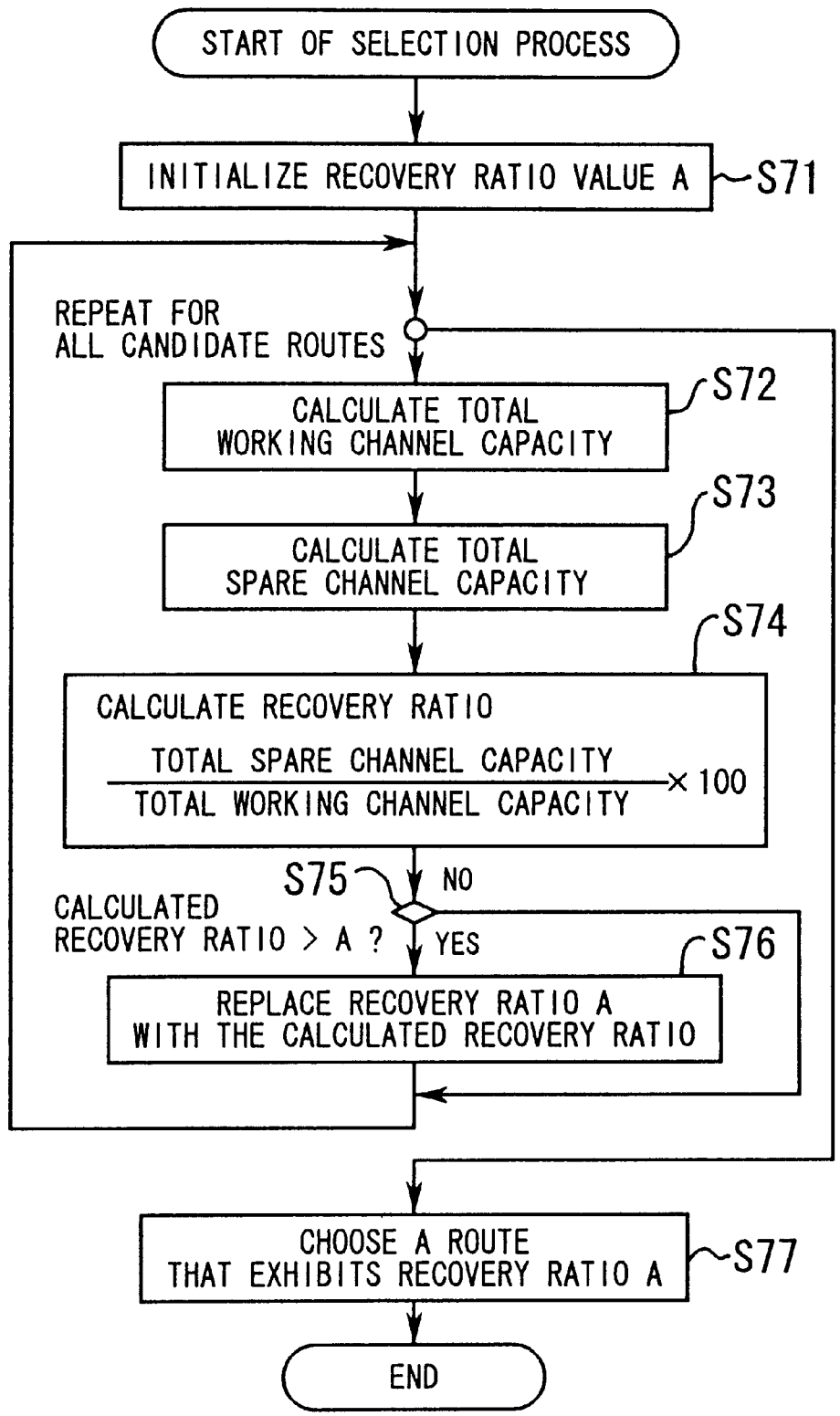
FIG. 19 is a flowchart showing a route selection process in an eighth embodiment of the present invention.
Figure 20:
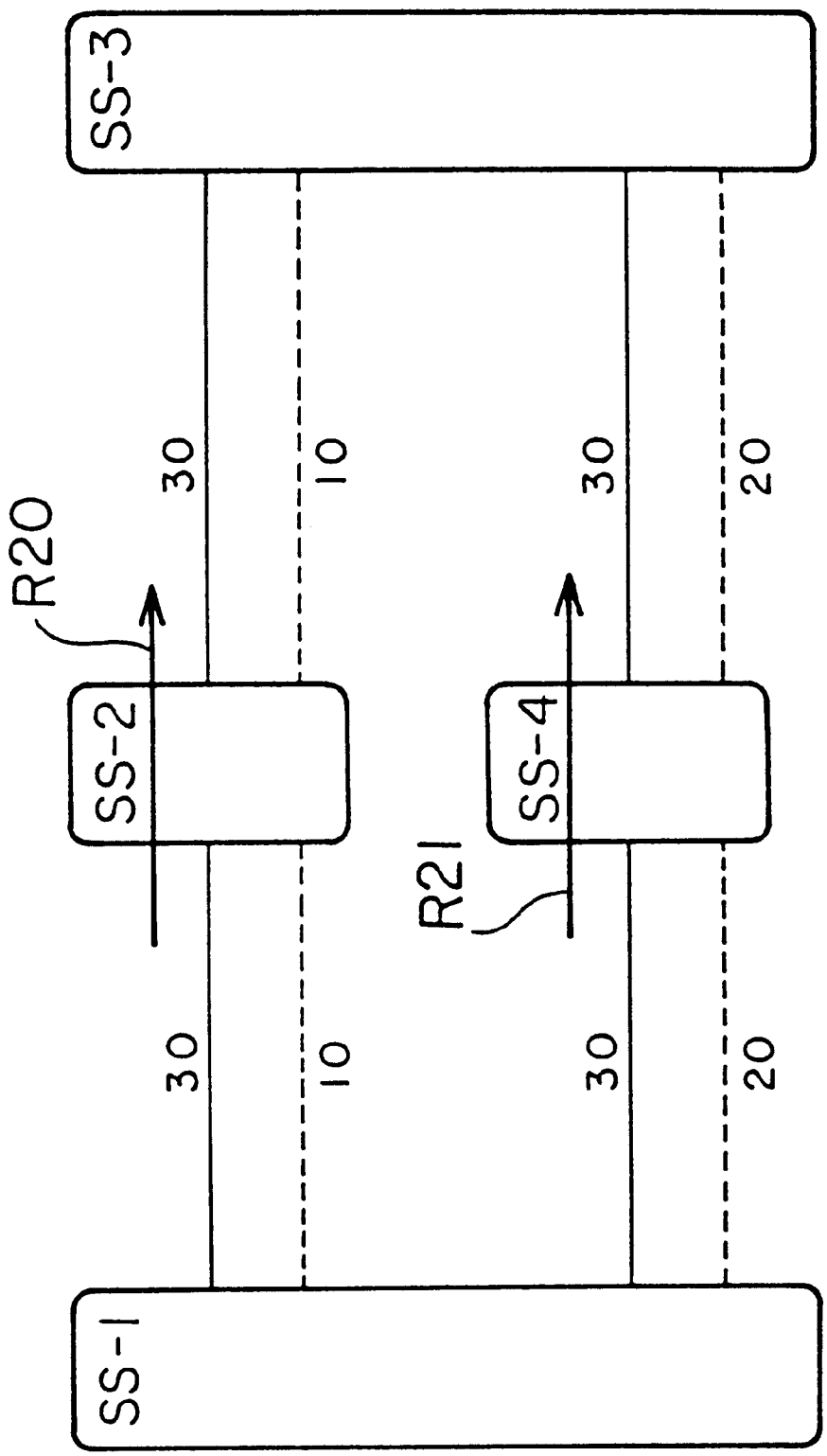
FIG. 20 is a diagram showing an example of a fast packet-switched network.

Referring next to FIGS. 19 and 20, an eighth embodiment of the present invention will be explained below. This eighth embodiment has the same structure as that of the first embodiment shown in FIGS. 2 and 3. Since it differs from the first embodiment only in the route selection process performed by the RMG unit, the following description will focus on this difference.

FIG. 19 is a flowchart showing a route selection process to be executed by the RMG unit. It should be noted here that this flowchart omits a process of total capacity-based route selection that should be executed in advance to the steps of this the flowchart. More specifically, for every candidate route, the RMG unit sums up the channel capacities of inter-node links on the route, and chooses the route(s) that exhibit the largest total channel capacity. The RMG unit then start the route selection process of FIG. 19 only when this total capacity-based route selection has failed to narrow down the candidates to one.

The route selection process is initiated when the network system is set up or the channel capacity is changed. The detailed procedure will be explained below according to the sequence of steps shown in FIG. 19. The explanation will also refer to FIG. 20 as an example of a fast packet-switched network to provide more specific description where appropriate.

[S71] The RMG unit introduces a factor named "backup ratio (A)" for each candidate route, which is initialized to zero.

[S72] For each candidate route, the RMG unit sums up the channel capacity of every inter-node link as part of the working channel, thereby obtaining the total working channel capacity.

In the example case shown in FIG. 20, the total working channel capacity of the route R20 is "60" (i.e., 30+30), and that of route R21 is also "60" (i.e., 30+30).

[S73] The RMG unit sums up the channel capacity of every inter-node link as part of the spare channel running on the candidate route presently concerned, thereby obtaining the total spare channel capacity.

In FIG. 20, the total spare channel capacity of the route R20 is "20" (i.e., 10+10), while that of the other route R21 is "40" (i.e., 20+20).

[S74] The RMG unit calculates the backup ratio by dividing the total spare channel capacity obtained in step S73 by the total working channel capacity obtained in step S72, and then multiplying the quotient by 100. This backup ratio indicates the percentage of working channel capacity that the spare channel can back up when the working channel is totally lost.

In FIG. 20, the backup ratio of the route R20 is 33.3 percent (i.e., (20÷60)×100), while that of the other route R21 is 66.6 percent (i.e., (40÷60)×100).

[S75] The RMG unit then compares the backup ratio obtained in step S74 with the present value A of the backup ratio. If the obtained backup ratio is greater than the present value A, the process advances to step S76. If it is not greater than the present value A, the process skips step S76 and returns to step S72 to process the next candidate route.

[S76] The present value A of the backup ratio is replaced with the backup ratio calculated in step S74.

The above steps S72 to S76 are repeated for all the candidate routes.

[S77] The resultant value A of backup ratio indicates the maximum backup ratio. The RMG unit chooses the best route that exhibits this maximum backup ratio.

More specifically, in FIG. 20, the maximum value of the backup ratio is 66.6 percent, which is provided by the candidate route R21. Therefore, the RMG unit chooses the route 21 as the best route.

As such, in the case that a plurality of routes have spare channels, the RMG unit in the eighth embodiment will selects a route that maximizes the backup ratio. In other words, it chooses the most fault-tolerant route for more reliable packet transmission.

Figure 21:
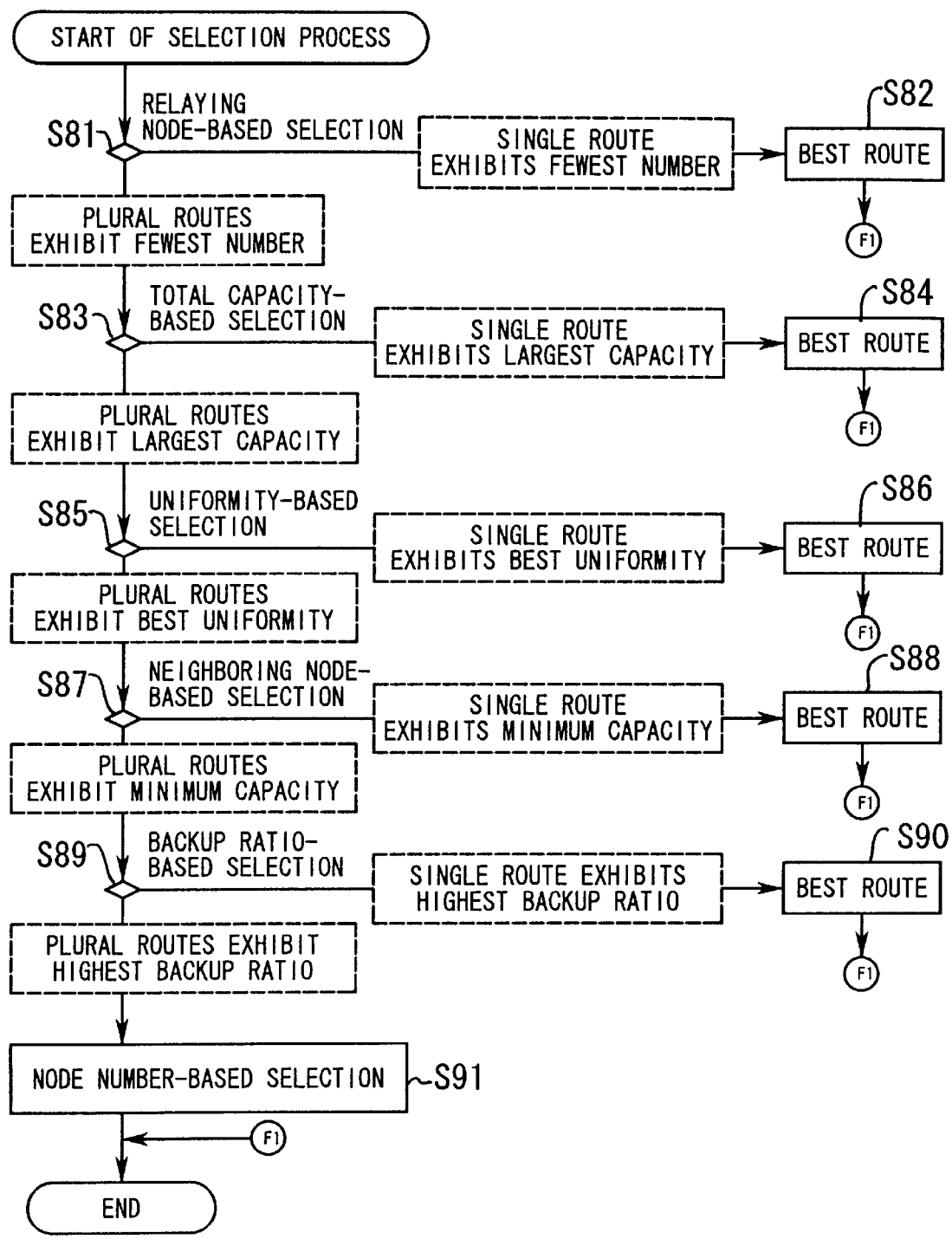
FIG. 21 is a flowchart showing a route selection process in a ninth embodiment of the present invention.

Referring next to FIG. 21, a ninth embodiment of the present invention will be explained below. This ninth embodiment has the same structure as that of the first embodiment shown in FIGS. 2 and 3. Since it differs from the first embodiment only in the route selection process performed by the RMG unit, the following description will focus on this difference.

FIG. 21 is a flowchart showing a route selection process performed by the RMG unit. This route selection process is initiated when the network system is set up or the channel capacity is changed. The detailed procedure will be explained below according to the sequence of steps shown in FIG. 21.

[S81] For each candidate route, the RMG unit counts the number of relaying nodes between the sending node and receiving node. The RMG unit then investigates the number of routes that exhibit the smallest number of relaying nodes. If this relaying node-based route selection results in a single route, the process advances to step S82. If two or more routes have the same number of relaying nodes, the process advances to step S83.

[S82] The RMG unit chooses the sole route as the best route.

[S83] For every candidate route, the RMG unit sums up the channel capacities of inter-node links on the route, and counts the number of routes that exhibit the largest total channel capacity. If this total capacity-based selection results in a single best route having the maximum channel capacity, the process advances to step S84. If two or more candidate routes indicate the same value of total channel capacity, the process proceeds to step S85 for further investigation.

[S84] The RMG unit chooses the sole route as the best route.

[S85] The RMG unit executes a uniformity-based route selection according to the flowchart of FIG. 5 as in the first embodiment described earlier. If this route selection process leads to a single best route that exhibits the minimum value of the maximum channel uniformity index, the current process advances to step S86. If two or more routes indicate the same value of the maximum channel uniformity index, the process goes to step S87 for further investigation.

[S86] The RMG unit chooses the sole route as the best route.

[S87] The RMG unit executes a neighboring node-based route selection process according to the flowchart of FIG. 11 as in the fourth embodiment described earlier. If this route selection process leads to a single best route that shows the minimum total capacity of inter-node links extending to neighboring nodes, the current process advances to step S88. If two or more candidate routes are ranked in the same place, the process proceeds to step S89 for further investigation.

[S88] The RMG unit chooses the sole route as the best route.

[S89] The RMG unit executes a backup ratio-based route selection process according to the flowchart of FIG. 19 as in the eighth embodiment described earlier. If this route selection process leads to a single best route that exhibits the highest backup ratio, the current process advances to step S90. If two or more candidate routes show the same backup ratio, the process proceeds to step S91 for the final decision.

[S90] The RMG unit chooses the sole route as the best route.

[S91] The RMG unit makes a node number-based selection; it chooses a route including a relaying node with the smallest node number, where the serial node numbers are previously affixed to all the relaying nodes for identification purposes.

Figure 22:
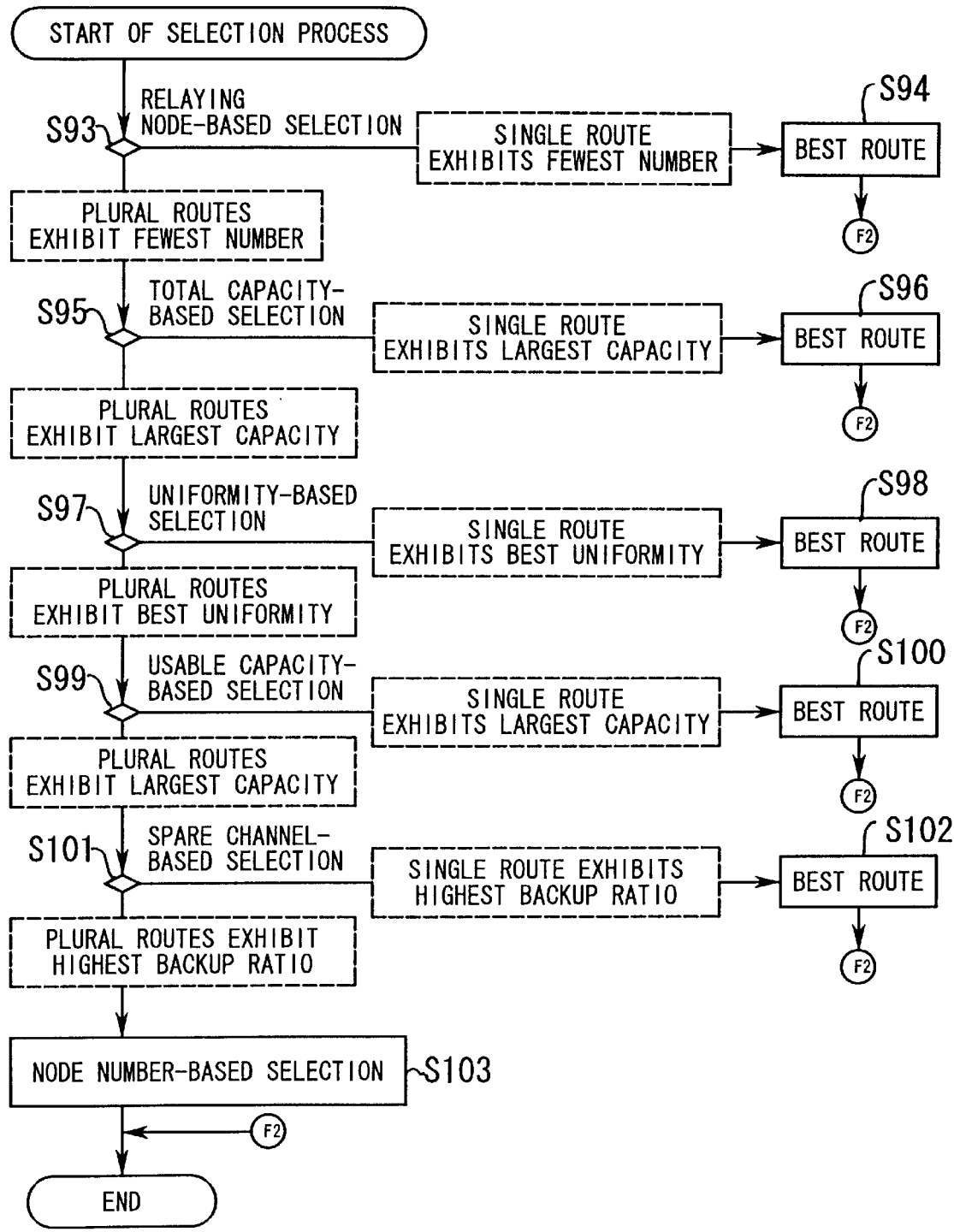
FIG. 22 is a flowchart showing a route selection process in a tenth embodiment of the present invention.

Referring next to FIG. 22, a tenth embodiment of the present invention will be explained below. This tenth embodiment has the same structure as that of the first embodiment shown in FIGS. 2 and 3. Since it differs from the first embodiment only in the route selection process performed by the RMG unit, the following description will focus on this difference.

FIG. 22 is a flowchart showing a route selection process executed by the RMG unit. This route selection process is initiated when the network system is set up or the channel capacity is changed. The detailed procedure will be explained below according to the sequence of steps shown in FIG. 22.

[S93] For every candidate route, the RMG unit counts the number of relaying nodes between the sending node and receiving node. The RMG unit then investigates the number of routes that exhibit the smallest number of relaying nodes. If this relaying node-based selection process leads to a single best route, the current process advances to step S94. If two or more candidate routes remain unresolved, the process proceeds to step S95 for further investigation.

[S94] The RMG unit chooses the sole route as the best route.

[S95] For every candidate route, the RMG unit sums up the channel capacities of inter-node links on the route, and counts the number of routes that exhibit the largest total channel capacity. If this total capacity-based selection process leads to a single best route, the current process advances to step S96. If two or more candidate routes remain unresolved, the process proceeds to step S97 for further investigation.

[S96] The RMG unit chooses the sole route as the best route.

[S97] The RMG unit executes a uniformity-based route selection process according to the flowchart of FIG. 5 as in the first embodiment described earlier. If this uniformity-based selection process leads to a single best route, the current process advances to step S98. If two or more candidate routes remain unresolved, the process proceeds to step S99 for further investigation.

[S98] The RMG unit chooses the sole route as the best route.

[S99] The RMG unit executes a usable capacity-based route selection process according to the flowchart of FIG. 9 as in the third embodiment described earlier. If this selection process leads to a single best route that exhibits the largest total usable channel capacity, the current process advances to step S100. If two or more candidate routes remain unresolved, the process proceeds to step S101 for further investigation.

[S100] The RMG unit chooses the sole route as the best route.

[S101] The RMG unit executes a backup ratio-based route selection process according to the flowchart of FIG. 19 as in the eighth embodiment described earlier. If a single best route is obtained as a result of this backup ratio-based selection process, the current process advances to step S102. If two or more candidate routes remain unresolved, the process proceeds to step S103 for final decision.

[S102] The RMG unit chooses the sole route as the best route.

[S103] The RMG unit finally makes a node number-based selection; it chooses a route including a relaying node with the smallest node number, where the serial node numbers are previously affixed to all the relaying nodes for identification purposes.

Figure 23:
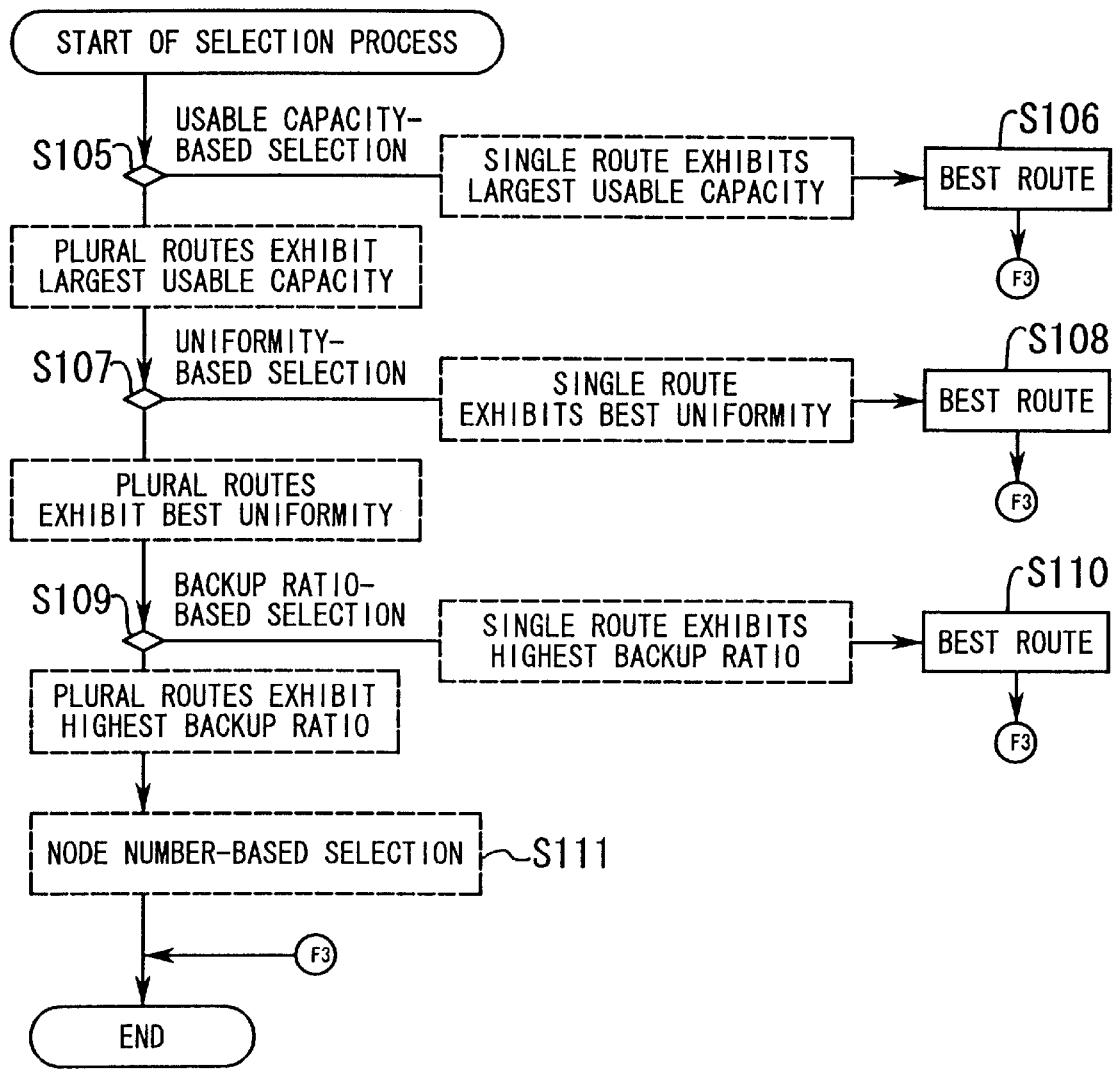
FIG. 23 is a flowchart showing a route selection process in an eleventh embodiment of the present invention.
Figure 24:
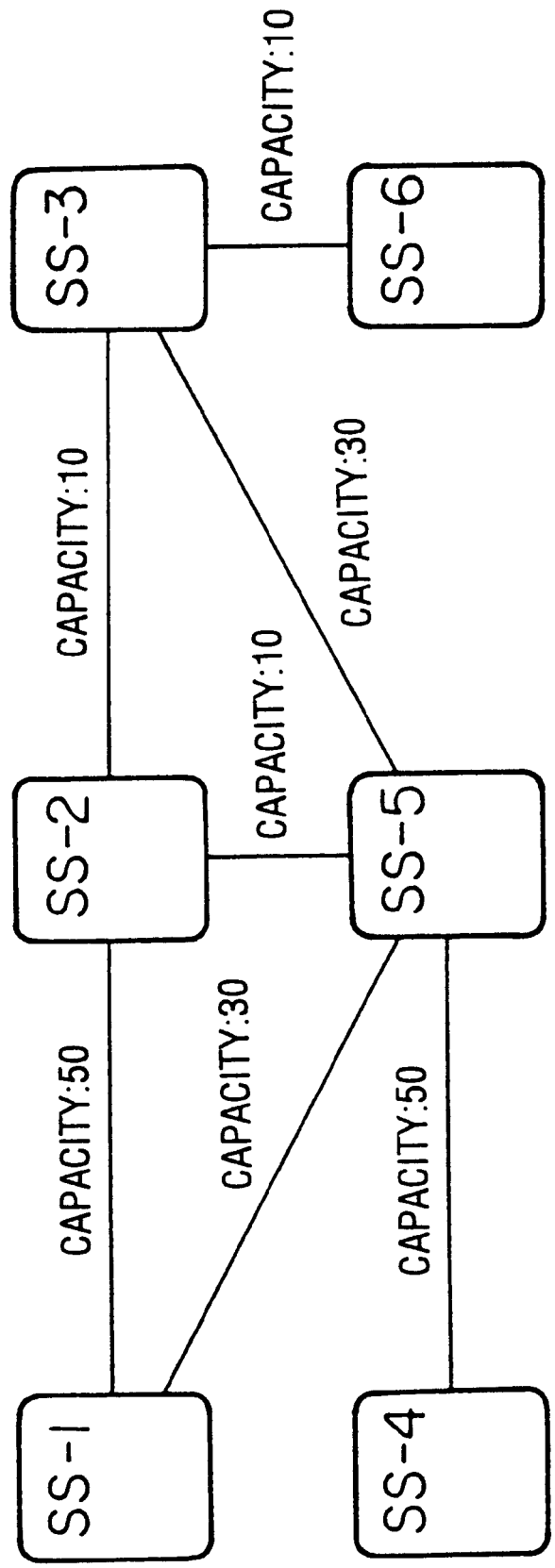
FIG. 24 is a diagram showing an example of a fast packet-switched network.
Figure 26:
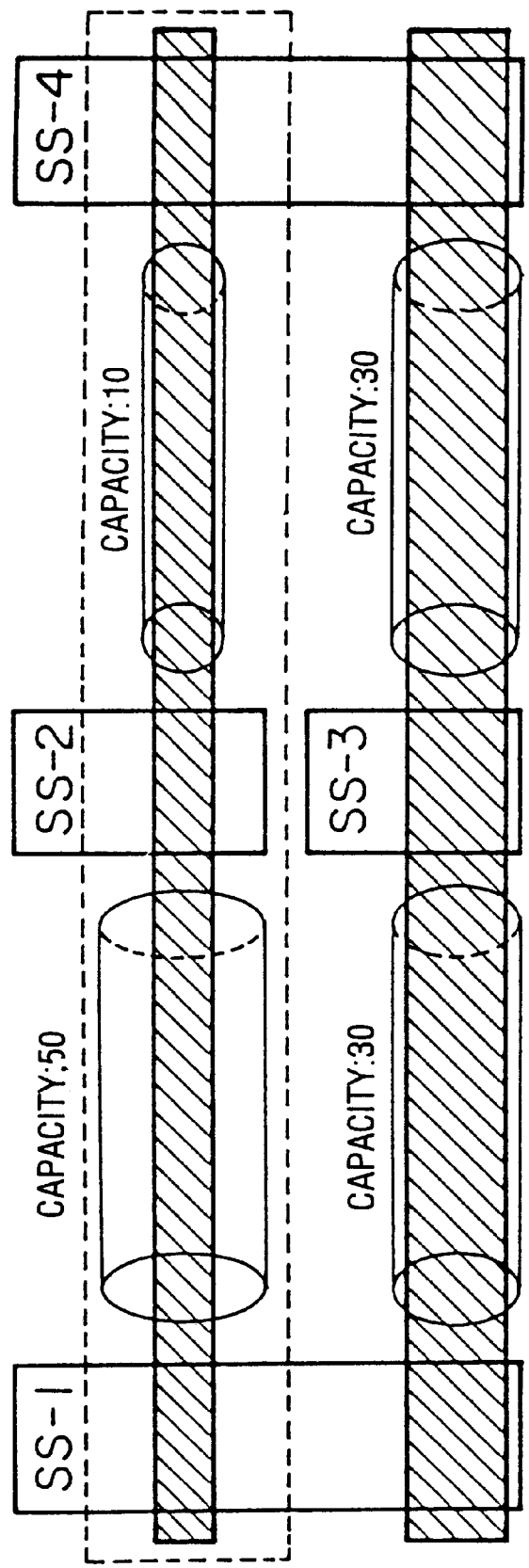
FIG. 26 is a diagram which explains a first problem with the conventional routing methods.
Figure 27:
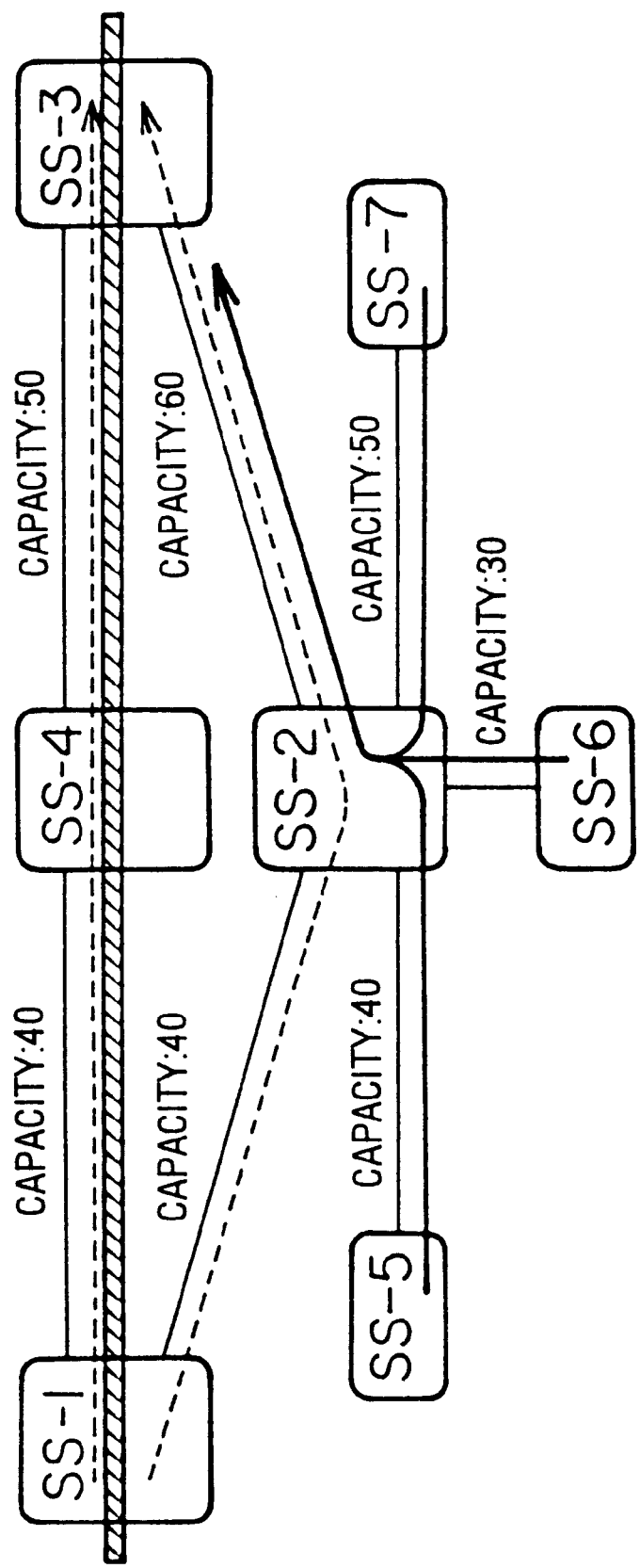
FIG. 27 is a diagram which explains a second problem with the conventional routing methods.
Figure 28:
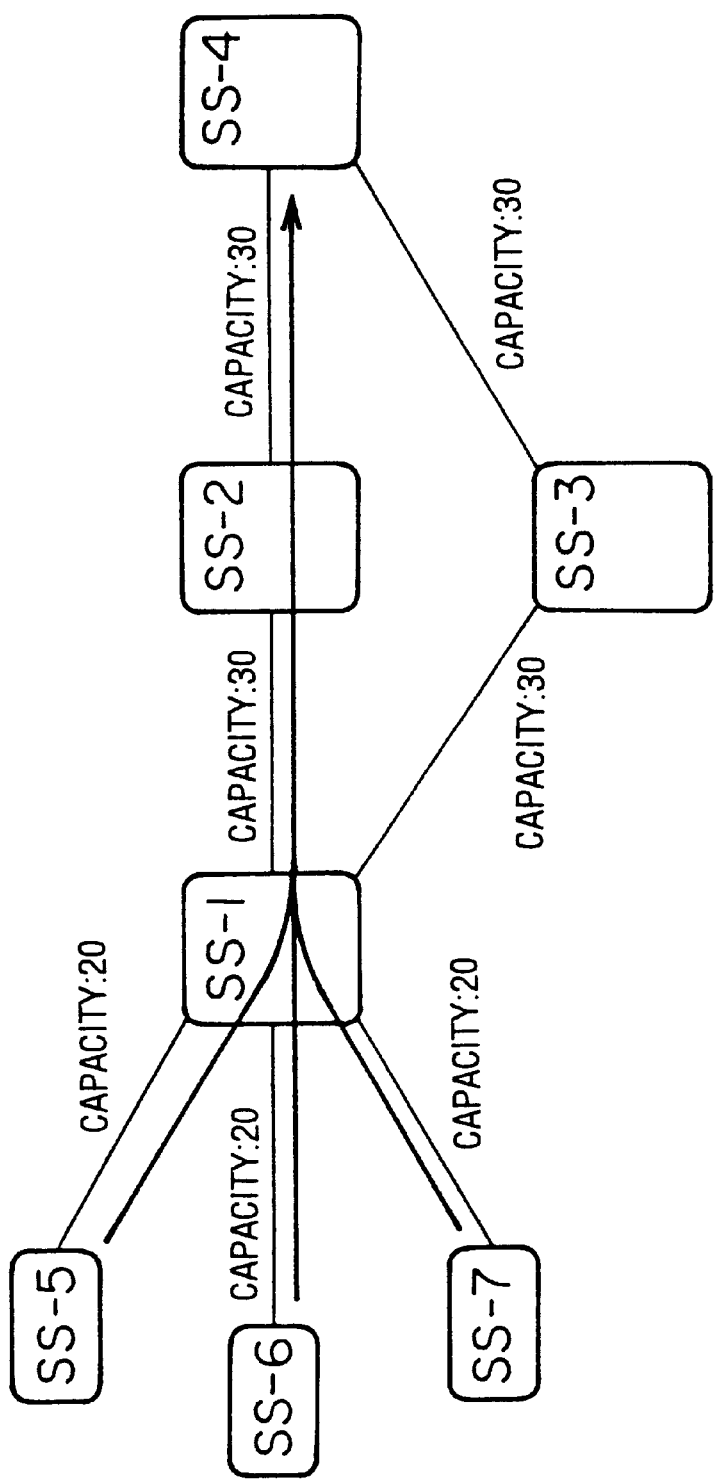
FIG. 28 is a diagram which explains a third problem with the conventional routing methods.
Figure 29:
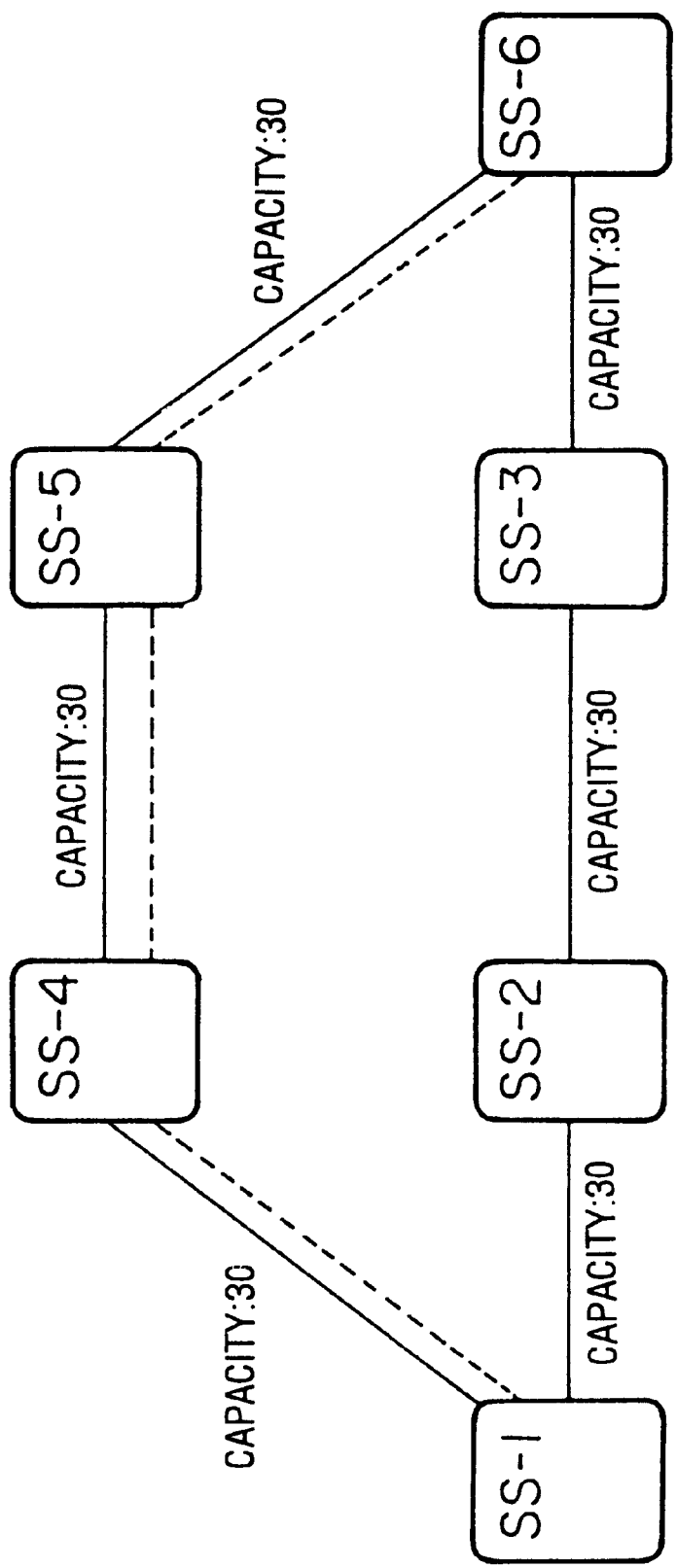
FIG. 29 is a diagram which explains a fourth problem with the conventional routing methods.

Referring next to FIG. 23, an eleventh embodiment of the present invention will be explained below. This eleventh embodiment has the same structure as that of the first embodiment shown in FIGS. 2 and 3. Since it differs from the first embodiment only in the route selection process performed by the RMG unit, the following description will focus on this difference.

FIG. 23 is a flowchart showing a route selection process performed by the RMG unit. This route selection process is initiated when the network system is set up or the channel capacity is changed. The detailed procedure will be explained below according to the sequence of steps shown in FIG. 23.

[S105] The RMG unit executes a usable capacity-based route selection according to the flowchart of FIG. 9 as in the third embodiment described earlier. If this route selection leads to a single best route that exhibits the largest total usable channel capacity, the current process advances to step S106. If two or more candidate routes remain unresolved, the process proceeds to step S107 for further investigation.

[S106] The RMG unit chooses the sole route as the best route.

[S107] The RMG unit executes a uniformity-based route selection according to the flowchart of FIG. 5 as in the first embodiment described earlier. If this route selection leads to a single best route that exhibits the best uniformity, the current process advances to step S108. If two or more candidate routes remain unresolved, the process proceeds to step S109 for further investigation.

[S108] The RMG unit chooses the sole route as the best route.

[S109] The RMG unit executes a backup ratio-based route selection according to the flowchart of FIG. 19 as in the eighth embodiment described earlier. If this backup ratio-based selection leads to a single best route that exhibits the highest backup ratio, the current process advances to step S110. If two or more candidate routes remain unresolved, the process proceeds to step S111 for final decision.

[S110] The RMG unit chooses the sole route as the best route.

[S111] The RMG unit finally makes a node number-based selection; it chooses a route including a relaying node with the smallest node number, where the serial node numbers are previously affixed to all the relaying nodes for identification purposes.

The above discussion will be summarized as follows. The present invention proposes various route selection algorithms and their combinations. One of those algorithms chooses a route that exhibits the best uniformity in terms of channel capacity from among a plurality of candidate routes. They also include some algorithms to choose a route that is less likely to be affected by packet traffic flowing into relaying nodes involved therein. The present invention further provides a route selection algorithm to choose a route that has a spare channel which exhibits the highest backup ratio. With those route selection algorithms and processes, the present invention allows more stable and reliable packet transmission.

Furthermore, the present invention assigns a plurality of sending nodes equally to a plurality of available routes. The present invention also assigns a plurality of user terminals that belong to a single sending node equally to a plurality of available routes, thereby allowing a limited number of routes to be effectively utilized.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for selecting a route in a packet-switched communications network where a plurality of candidate routes are available between a sending node and a receiving node, each candidate route being formed by a plurality of inter-node links that are joined together by relaying nodes, the inter-node links having predetermined channel capacities, the apparatus comprising:

total capacity calculation means for calculating total channel capacity of each candidate route by summing up the channel capacities of the inter-node links between the sending node and the receiving node;

first selection means for obtaining at least one first-selected route by choosing at least one candidate route that exhibits the largest value of the total channel capacity calculated by said total capacity calculation means;

uniformity calculation means, activated when said first selection means selected a plurality of first-selected routes, for calculating uniformity of each of the first-selected routes by evaluating the channel capacities of the inter-node links thereof; and second selection means, coupled to said uniformity calculation means, for choosing one of the first-selected routes based on the uniformity calculated by said uniformity calculation means.

2. The apparatus according to claim 1, wherein said uniformity calculation means comprises average value calculation means for calculating an average value of the channel capacities of the inter-node links constituting each of the first-selected route, and uniformity determination means for determining the uniformity of each first-selected route by calculating a reciprocal value of a difference between the channel capacity of each inter-node link and the average value that is calculated by said average value calculation means, and extracting the largest reciprocal value from among the reciprocal values calculated for all the inter-node links as part of each first-selected route.

3. An apparatus for selecting a route in a packet-switched communications network where a plurality of candidate routes are available between a sending node and a receiving node, each candidate route being formed by a plurality of inter-node links that are joined together by relaying nodes, the inter-node links having predetermined channel capacities, the apparatus comprising:

total capacity calculation means for calculating total channel capacity of each candidate route by summing up the channel capacities of the inter-node links between the sending node and the receiving node;

first selection means for obtaining at least one first-selected route by choosing at least one candidate route that exhibits the largest value of the total channel capacity calculated by said total capacity calculation means;

decision means, activated when said first selection means selected a plurality of first-selected routes, for investigating each relaying node involved in each first-selected route to clarify whether the relaying node under the investigation has any branching link that branches toward another node that does not belongs to the first-selected route under the investigation; and second selection means, coupled to said decision means, for choosing one of the first-selected routes based on results of the investigation performed by said decision means.

4. The apparatus according to claim 3 further comprising:

summation means, activated when said decision means clarified that all the first-selected routes have at least one branching link to another node, for obtaining a total branching capacity for each of the first-selected routes by summing up the channel capacities of all the branching links originating from the relaying nodes thereof, and third selection means coupled to said summation means for choosing one of the first-selected routes which exhibits the smallest total branching capacity.

5. An apparatus for selecting a route in a packet-switched communications network where a plurality of candidate routes are available between a sending node and a receiving node, each candidate route being formed by a plurality of inter-node links that are joined together by relaying nodes, the inter-node links having predetermined channel capacities, the apparatus comprising:

usable capacity calculation means for calculating a usable channel capacity of each inter-node link of each candidate route, the usable channel capacity being a portion of the channel capacity that can be used for packet transmission from the sending node to the receiving node via the candidate route under investigation;

total capacity calculation means for calculating total channel capacity of each candidate route by summing up the usable channel capacity calculated by said usable capacity calculation means; and selection means for choosing one candidate route that exhibits the largest value of the total channel capacity calculated by said total capacity calculation means.

6. The apparatus according to claim 5, wherein said usable capacity calculation means comprises first usable capacity calculation means for calculating the usable channel capacity, while considering affection of packet traffic to/from other nodes when the relaying nodes on the candidate route have at least one branching link that branches toward another node that does not belongs to the candidate route concerned, and second usable capacity calculation means for calculating the usable channel capacity, while assuming that the whole channel capacity of each inter-node link on the candidate route can be used for packet transmission from the sending node to the receiving node, when the relaying nodes on the candidate route have no branching links.

7. An apparatus for selecting a route in a packet-switched communications network where a plurality of sending nodes are linked to a particular relaying node and a plurality of candidate routes are available between the particular relaying node and a receiving node, each candidate route being formed by a plurality of inter-node links that are joined together by other relaying nodes, the inter-node links having predetermined channel capacities, the apparatus comprising:

total capacity calculation means for calculating total channel capacity of each candidate route by summing up the channel capacities of the inter-node links between the sending node and the receiving node;

selection means for choosing at least one candidate route that exhibits the largest value of the total channel capacity calculated by said total capacity calculation means; and signal assignment means, activated when said selection means chose a plurality of candidate routes, for assigning signals sent to/from the plurality of sending nodes equally to the plurality of candidate routes selected by said selection means.

8. An apparatus for selecting a route in a packet-switched communications network where a plurality of candidate routes are available between a sending node and a receiving node, each candidate route being formed by a plurality of inter-node links that are joined together by other relaying nodes, the inter-node links having predetermined channel capacities, the sending node handling transmission signals to/from a plurality of user terminals, the apparatus comprising:

total capacity calculation means for calculating total channel capacity of each candidate route by summing up the channel capacities of the inter-node links between the sending node and the receiving node;

selection means for choosing at least one candidate route that exhibits the largest value of the total channel capacity calculated by said total capacity calculation means; and signal assignment means, activated when said selection means chose a plurality of candidate routes, for assigning the transmission signals sent to/from the plurality of user terminals equally to the plurality of candidate routes selected by said selection means.

9. An apparatus for selecting a route in a packet-switched communications network where a plurality of candidate routes are available between a sending node and a receiving node, each candidate route being formed by a plurality of inter-node links that are joined together by relaying nodes, the inter-node links having predetermined channel capacities, the apparatus comprising:

total capacity calculation means for calculating total channel capacity of each candidate route by summing up the channel capacities of the inter-node link between the sending node and the receiving node;

first selection means for obtaining at least one first-selected route by choosing at least one candidate route that exhibits the largest value of the total channel capacity calculated by said total capacity calculation means;

decision means, activated when said first selection means selected a plurality of first-selected routes, for examining whether each first-selected route has a spare channel for backup purposes or not; and second selection means, activated when said decision means found that there is only one first-selected routes having a spare channel, for choosing said only one first-selected routes.

10. The apparatus according to claim 9, further comprising:

backup ratio calculation means, activated when said decision means found that two or more routes out of the first-selected routes have a spare channel, for calculating a backup ratio that indicates how much percent of the channel capacity are backed up by the spare route, and third selection means for choosing one of the first-selected routes that exhibits the largest value of the backup ratio calculated by said backup ratio calculation means.

11. The apparatus according to claim 10, said backup ratio calculation means comprises working-channel capacity summation means for calculating total working-channel capacity by summing up the channel capacities of the inter-node links of each working channel as part of each first-selected route having the spare channel, spare-channel capacity summation means for calculating total spare-channel capacity by summing up the channel capacities of the inter-node links of each spare channel as part of each first-selected route having the spare channel, and division means for obtaining the backup ratio by dividing the total spare-channel capacity by the total working-channel capacity.

12. An apparatus for selecting a route in a packet-switched communications network where a plurality of candidate routes are available between a sending node and a receiving node, each candidate route being formed by a plurality of inter-node links that are joined together by relaying nodes, the inter-node link having predetermined channel capacities, the apparatus comprising:

total capacity calculation means for calculating total channel capacity of each candidate route by summing up the channel capacities of the inter-node links between the sending node and the receiving node;

first selection means for obtaining at least one first-selected route by choosing at least one candidate route that exhibits the largest value of the total channel capacity calculated by said total capacity calculation means;

uniformity calculation means, activated when said first selection means selected a plurality of first-selected routes, for calculating uniformity of each of the first-selected routes by evaluating the channel capacities of the inter-node links thereof;

second selection means, coupled to said uniformity calculation means, for obtaining at least one second-selected route by choosing at least one of the first-selected routes based on the uniformity calculated by said uniformity calculation means;

first decision means, activated when said second selection means selected a plurality of second-selected routes, for investigating each relaying node involved in each second-selected route to clarify whether the relaying node under the investigation has any branching link that branches toward another node that does not belongs to the second-selected route under the investigation;

summation means, activated when said first decision means clarified that all the second-selected routes have at least one branching link to another node, for obtaining a total branching capacity for each of the second-selected routes by summing up the channel capacities of all the branching links originating from the relaying nodes thereof;

third selection means coupled to said summation means for obtaining at least one third-selected route by choosing at least one of the second-selected routes which exhibits the smallest total branching capacity;

second decision means, activated when said third selection means selected a plurality of third-selected routes, for examining whether or not each third-selected route is equipped with a spare channel for backup purposes;

backup ratio calculation means, activated when said second decision means found that two or more routes out of the third-selected routes have a spare channel, for calculating a backup ratio that indicates how much percent of the channel capacity are backed up by the spare route; and fourth selection means for choosing one of the third-selected routes that exhibits the largest value of the backup ratio calculated by said backup ratio calculation means.

13. An apparatus for selecting a route in a packet-switched communications network where a plurality of candidate routes are available between a sending node and a receiving node, each candidate route being formed by a plurality of inter-node links that are joined together by relaying nodes, the inter-node link having predetermined channel capacities, the apparatus comprising:

first total capacity calculation means for calculating total channel capacity of each candidate route by summing up the channel capacities of the inter-node links between the sending node and the receiving node;

first selection means for obtaining at least one first-selected route by choosing at least one candidate route that exhibits the largest value of the total channel capacity calculated by said first total capacity calculation means;

uniformity calculation means, activated when said first selection means selected a plurality of first-selected routes, for calculating uniformity of each of the first-selected routes by evaluating the channel capacities of the inter-node links thereof;

second selection means, coupled to said uniformity calculation means, for obtaining at least one second-selected route by choosing at least one of the first-selected routes based on the uniformity calculated by said uniformity calculation means;

usable capacity calculation means, activated when said second selection means selected a plurality of second-selected routes, for calculating a usable channel capacity of each inter-node link of each second-selected route, the usable channel capacity being a portion of the channel capacity that can be used for packet transmission from the sending node to the receiving node via the second-selected route concerned;

second total capacity calculation means for calculating total usable channel capacity of each second-selected route by summing up the usable channel capacity calculated by said usable capacity calculation means;

third selection means for obtaining at least one third-selected route by choosing at least one of the second-selected routes that exhibits the largest value of the total usable channel capacity calculated by said second total capacity calculation means;

decision means, activated when said third selection means selected a plurality of third-selected routes, for examining whether or not each third-selected route is equipped with a spare channel for backup purposes;

backup ratio calculation means, activated when said decision means found that two or more routes out of the third-selected routes have a spare channel, for calculating a backup ratio which indicates how much percent of the channel capacity are backed up by the spare route; and fourth selection means for choosing one of the third-selected routes that exhibits the largest value of the backup ratio calculated by said backup ratio calculation means.

14. An apparatus for selecting a route in a packet-switched communications network where a plurality of candidate routes are available between a sending node and a receiving node, each candidate route being formed by a plurality of inter-node links that are joined together by relaying nodes, the inter-node links having predetermined channel capacities, the apparatus comprising:

usable capacity calculation means for calculating a usable channel capacity of each inter-node link of each candidate route, the usable channel capacity being a portion of the channel capacity that can be used for packet transmission from the sending node to the receiving node via the candidate route under investigation;

total capacity calculation means for calculating total channel capacity of each candidate route by summing up the usable channel capacity calculated by said usable capacity calculation means;

first selection means for obtaining at least one first-selected route by choosing at least one candidate route that exhibits the largest value of the total channel capacity calculated by said total capacity calculation means;

uniformity calculation means, activated when said first selection means selected a plurality of first-selected routes, for calculating uniformity of each of the first-selected routes by evaluating the channel capacities of the inter-node links thereof;

second selection means, coupled to said uniformity calculation means, for obtaining at least one second-selected route by choosing at least one of the first-selected routes based on the uniformity calculated by said uniformity calculation means;

decision means, activated when said second selection means selected a plurality of second-selected routes, for examining whether or not each second-selected route is equipped with a spare channel for backup purposes;

backup ratio calculation means, activated when said decision means found that two or more routes out of the second-selected routes each have a spare channel, for calculating a backup ratio which indicates how much percent of the channel capacity are backed up by the spare route; and third selection means for choosing one of the second-selected routes that exhibits the largest value of the backup ratio calculated by said backup ratio calculation means.

* * * * *